(12) United States Patent
Shimada

(10) Patent No.: US 10,688,911 B2
(45) Date of Patent: Jun. 23, 2020

(54) ILLUMINATION APPARATUS

(71) Applicant: MAXELL, LTD., Kyoto (JP)

(72) Inventor: Kenichi Shimada, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/463,497

(22) PCT Filed: Nov. 24, 2016

(86) PCT No.: PCT/JP2016/084822
§ 371 (c)(1),
(2) Date: May 23, 2019

(87) PCT Pub. No.: WO2018/096619
PCT Pub. Date: May 31, 2018

(65) Prior Publication Data
US 2019/0359121 A1 Nov. 28, 2019

(51) Int. Cl.
*B60Q 1/14* (2006.01)
*G06T 7/70* (2017.01)
(Continued)

(52) U.S. Cl.
CPC ....... *B60Q 1/1415* (2013.01); *G06K 9/00805* (2013.01); *G06K 9/00845* (2013.01); *G06T 7/0002* (2013.01); *G06T 7/70* (2017.01); *H04N 5/247* (2013.01); *B60Q 2300/054* (2013.01); *B60Q 2300/42* (2013.01); *B60Q 2300/45* (2013.01); *G01C 3/08* (2013.01);
(Continued)

(58) Field of Classification Search
None
See application file for complete search history.

(56) References Cited

U.S. PATENT DOCUMENTS

| 7,262,813 | B2 * | 8/2007 | Sato | B60R 11/02 348/602 |
| 2010/0052550 | A1 * | 3/2010 | Kobayashi | B60Q 1/143 315/158 |
| 2013/0169155 | A1 * | 7/2013 | Nakashima | B60Q 1/143 315/82 |

FOREIGN PATENT DOCUMENTS

| JP | 2009-090844 A | 4/2009 |
| JP | 2009-120147 A | 6/2009 |

(Continued)

OTHER PUBLICATIONS

International Search Report of PCT/JP2016/084822 dated Feb. 28, 2017.

*Primary Examiner* — Crystal L Hammond
(74) *Attorney, Agent, or Firm* — Mattingly & Malur, PC

(57) ABSTRACT

In an illumination apparatus arranged on a vehicle, image data of a plurality of pixels of an imaging region in front of the vehicle is created and an image processor calculates a luminance of each of the pixels on the basis of the image data. A controller is configured to calculate an average luminance of each of partial regions of the imaging region on the basis of the luminance of each of the pixels, to determine whether it is necessary to perform luminance adjustment for each of the partial regions, and to perform luminance adjustment for the partial region on the basis of a result of the determination. An illuminating unit having a plurality of light sources illuminates the partial region while allowing each light source to be adjusted so as to have a predetermined light quantity on the basis of the result of the luminance adjustment.

10 Claims, 14 Drawing Sheets

(51) Int. Cl.
    *G06K 9/00*          (2006.01)
    *G06T 7/00*           (2017.01)
    *H04N 5/247*        (2006.01)
    *G01C 3/08*          (2006.01)

(52) U.S. Cl.
    CPC ............... *G06T 2207/30201* (2013.01); *G06T 2207/30252* (2013.01); *G06T 2207/30261* (2013.01)

(56) References Cited

FOREIGN PATENT DOCUMENTS

| | | | |
|---|---|---|---|
| JP | 2009120147 A | * | 6/2009 |
| JP | 2009-204734 A | | 9/2009 |
| JP | 2010-052602 A | | 3/2010 |
| JP | 2012-061992 A | | 3/2012 |
| JP | 2014-121895 A | | 7/2014 |
| JP | 2015-009647 A | | 1/2015 |

* cited by examiner (a)

(b)

BEFORE LIGHT ADJUSTMENT (c)

AFTER LIGHT ADJUSTMENT (a)

(b)

(c)

(d)

(a)

(b)

IMAGING BY IMAGING UNIT 350L

IMAGING BY IMAGING UNIT 350R (a)

(b)

ILLUMINATION APPARATUS

TECHNICAL FIELD

The present invention relates to an illumination apparatus.

BACKGROUND ART

In order to suppress occurrence of car accidents during night to improve safety of car society, it is proposed to always use a headlight of a car during running as a high-beam headlight. Accordingly, in order to avoid glare on a car running ahead and an oncoming car while basically brightly illuminating eyesight of a driver during the running, an illumination apparatus on which a technique that is called Adaptive Driving Beam (ADB) partially turning off the headlight in accordance with surrounding circumstances has started to be practically used.

For example, a Patent Document 1 discloses a headlight apparatus and a luminance control method capable of adjust the luminance by determining whether it is necessary to dim the light of the own car. Specifically, the headlight apparatus has a state detecting means configured to detect a headlight state in which the headlight is being tuned on and a dimming controlling means configured to decrease the luminance of the headlight to a predetermined value larger than zero in accordance with the headlight turning-on state.

A Patent Document 2 discloses a light-distribution adjusting method and an illumination apparatus that prevent excessiveness and lack of luminance of each of illuminated objects close to and far from the illumination apparatus by acquiring each luminance of a plurality of partial regions corresponding to each of a plurality of light-distributing change elements forming a light-distribution changing unit from an image in an illuminated range under illumination light and by controlling optical parameters of each of the plurality of light-distributing change elements on the basis of each luminance, and discloses an imaging apparatus having an illumination apparatus that prevents excessiveness and lack of light exposure onto each imaged object close to and far from the illumination apparatus.

RELATED ART DOCUMENTS

Patent Documents

Patent Document 1: Japanese Patent Application Laid-Open Publication No. 2012-61992
Patent Document 2: Japanese Patent Application Laid-Open Publication No. 2009-204734

SUMMARY OF THE INVENTION

Problems to be Solved by the Invention

However, in the headlight apparatus disclosed in the Patent Document 1, a region of image data where brightness does not change much is used for determination of illuminance change. Therefore, for example, the illuminance of the headlight cannot be adjusted in accordance with states in which surrounding brightness dynamically changes for a driver of the car, such as illumination of a side road and illumination of a car that is running side by side.

In the illumination apparatus disclosed in the Patent Document 2, the light distribution of the illumination light is adjusted by acquiring luminance information of an emitting range of the illumination light in a stop state and by correcting the light to have a target luminance that is previously set for each of the partial regions. Therefore, in the unsteady state in which the surrounding brightness dynamically changes, for example, when surrounding luminance distribution cyclically changes, a function of correcting the light distribution of the headlight so as to exactly follow the change is undesirably operated. As a result, the driver possibly recognizes as if the illumination light flashes, and therefore, there is a risk of making the driver uncomfortable and tired. And, it is also considered that the flashing of the illumination light is mistaken for the headlight flashing.

Accordingly, an object of the present invention is to provide an illumination apparatus capable of appropriately adjusting the luminance even in a dynamically-changing state of the surrounding luminance, and provide a light-adjusting method of the illumination apparatus.

Means for Solving the Problems

The summary of the typical aspects of the inventions disclosed in the present application will be briefly described as follows.

An illumination apparatus arranged on a vehicle according to a typical embodiment of the present invention includes: an imaging unit configured to create an image made of a plurality of pixels by imaging a predetermined imaging region in front of the vehicle and to create image data for each pixel on the basis of the image; an image processor configured to calculate a luminance for each pixel on the basis of the image data; a controller configured to calculate an average luminance of each partial region of the imaging region made of a plurality of partial regions, to determine whether it is necessary to perform the luminance adjustment for each partial region on the basis of the average luminance and a luminance threshold defining an upper limit of the average luminance of the partial region, and to perform the luminance adjustment for the partial region on the basis of a result of the determination of the luminance adjustment; and an illuminating unit having a plurality of light sources and configured to illuminate the partial region while allowing each of the light sources to adjust the light source so as to have a predetermined light quantity on the basis of the luminance adjustment result of the luminance adjustment.

Effects of the Invention

The effects obtained by the typical aspects of the invention disclosed in the present application will be briefly described below. That is, according to the typical embodiment of the present invention, the luminance can be appropriately adjusted even in a state in which the surrounding luminance dynamically changes.

BRIEF DESCRIPTIONS OF THE DRAWINGS

BEST MODE FOR CARRYING OUT THE INVENTION

Hereinafter, embodiments of the present invention will be described in detail on the basis of the accompanying drawings. Note that the same components are denoted by the same reference symbols in principle throughout all the drawings for describing the embodiments, and the repetitive description thereof will be omitted.

First Embodiment

<Configuration of Illumination Apparatus>

Figure 1:
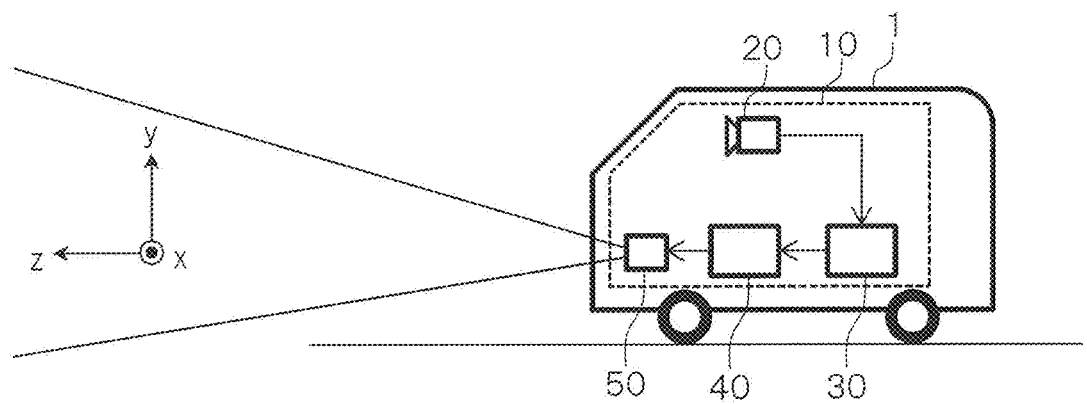
FIG. 1 is a diagram showing one example of a usage state of an illumination apparatus according to a first embodiment of the present invention.
Figure 1:
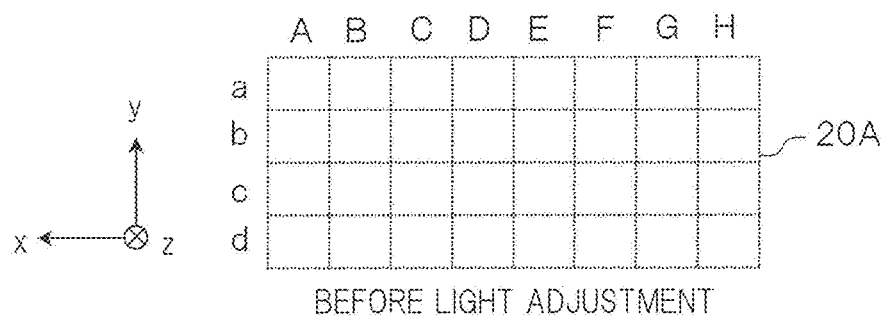
Figure 1:
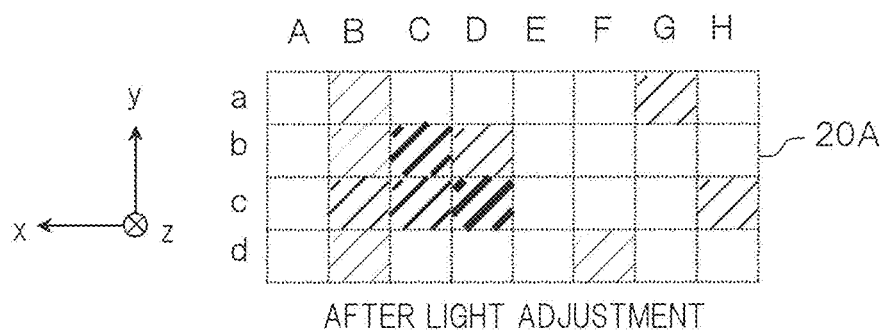
Figure 2:
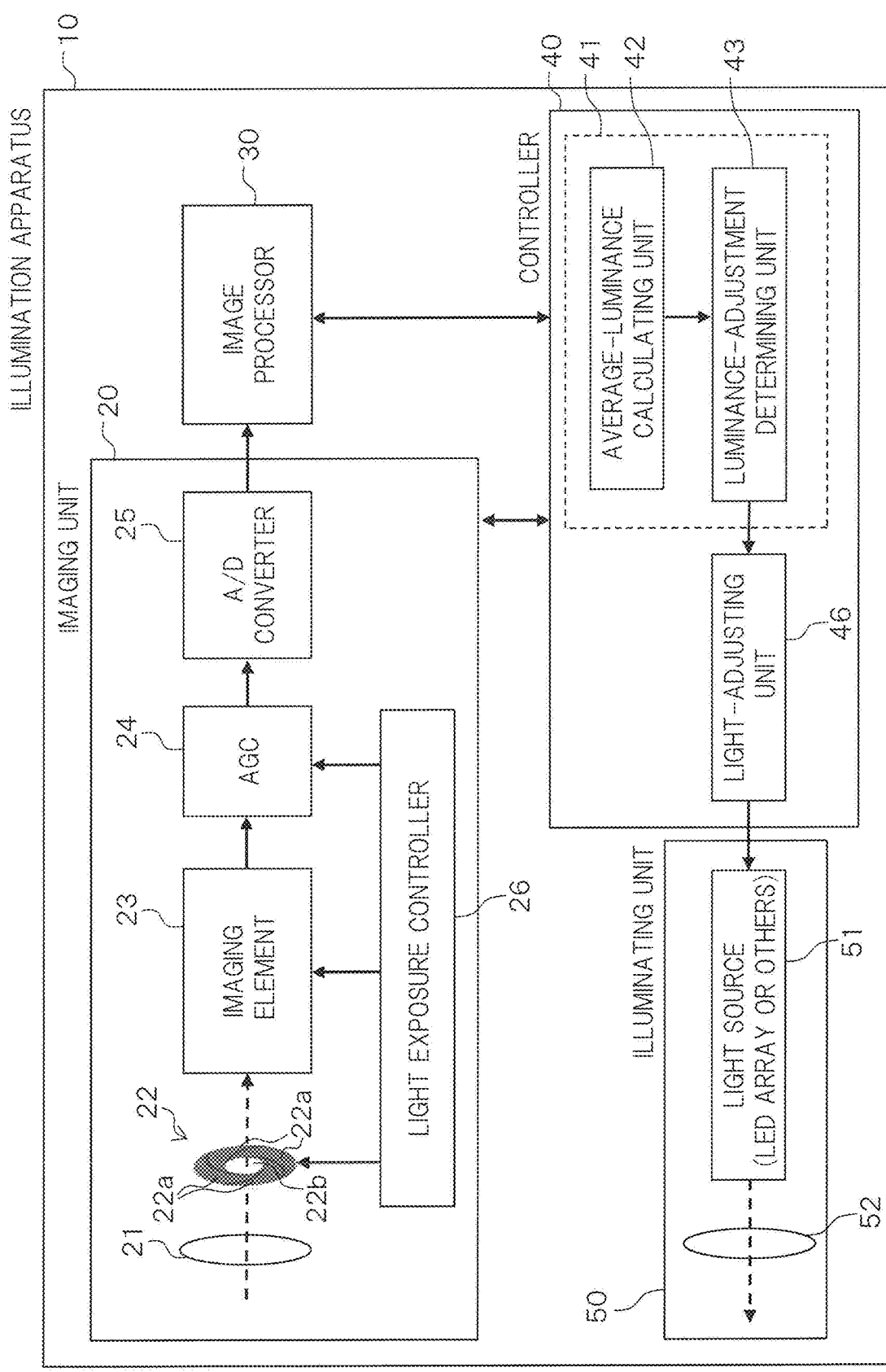
FIG. 2 is a diagram showing one example of a configuration of the illumination apparatus according to the first embodiment of the present invention.

FIG. 1 is a diagram showing one example of a usage state of an illumination apparatus according to a first embodiment of the present invention. FIG. 1(a) is a diagram showing a state in which the illumination apparatus illuminates a region in front of a vehicle. FIG. 1(b) is a diagram showing luminance distribution before light adjustment. FIG. 1(c) is a diagram showing luminance distribution after the light adjustment. FIG. 2 is a diagram showing one example of a configuration of the illumination apparatus according to the first embodiment of the present invention. As shown in FIG. 1(a), the vehicle 1 includes the illumination apparatus 10 and others. The illumination apparatus 10 illuminates, for example, a region in front of the vehicle 1 when the vehicle is running during night or others. As shown in FIG. 1(a), the illumination apparatus 10 illuminates, for example, a positive direction of a Z axis (a left direction in the drawing). As shown in FIGS. 1 and 2, the illumination apparatus 10 includes, for example, an imaging unit 20, an image process 30, a controller 40, and an illuminating unit 50, etc.

As shown in FIGS. 1(b) and (c), the imaging unit 20 takes an image of a predetermined imaging region 20A in front of the vehicle 1 (the positive direction of the Z axis) and creates an image. The imaging region 20A is made of, for example, a plurality of partial regions as shown in FIGS. 1(b) and (c). For example, the imaging region 20A is made of, for example, a plurality of partial regions that are divided into each of columns "A" to "H" along a longitudinal direction (Y direction) and divided into each of rows "a" to "d" along a horizontal direction (X direction) as shown in FIGS. 1(b) and (c). In the following, for example, note that a partial region at which the column A and the row a cross each other is described as a partial region "Aa", and a partial region at which the column H and the row d cross each other is described as a partial region "Hd", etc., in some cases. Note that FIG. 1(b) shows an example of division of the imaging region 20A into 32 partial regions. However, for example, the imaging region 20A may be divided into the number of partial regions that is equal to or larger than that or into the number of partial regions that is equal to or smaller than that.

As shown in FIG. 2, the imaging unit 20 includes, for example, an imaging lens 21; a diaphragm 22; an imaging element 23; an AGC (Automatic Gain Control) 24; an A/D convertor 25; and a light exposure controller 26, etc.

The imaging lens 21 collects light that reaches from the imaging region 20A. The imaging lens 21 adjusts a light path so that the collected light goes toward the imaging element 23. The imaging lens 21 may be made of one lens or a plurality of lenses.

The diaphragm 22 adjusts a light quantity of the light collected by the imaging lens 21. The diaphragm 22 is made of, for example, a plurality of diaphragm fins 22a, and an aperture diameter of the diaphragm 22 is adjusted by making difference in arrangement of the diaphragm fins 22a from one another. The diaphragm 22 adjusts the aperture diameter on the basis of control by the light exposure controller 26.

The imaging element 23 includes, for example, an electronic shutter; and an image sensor, both of which are not shown in the drawings. The electronic shutter is arranged between the diaphragm 22 and the image sensor, and adjusts a light exposure amount of the light emitted to the image sensor by adjusting a shutter speed. The electronic shutter adjusts the shutter speed on the basis of the control by the light exposure controller 26. The image sensor is made of, for example, a CMOS, a CCD or others having a plurality of pixels. The image sensor creates an image made of a plurality of pixels. For example, the image sensor creates the image by creating a pixel signal (such as a voltage) based on the light exposure amount for each pixel. Then, the image sensor outputs the created pixel signal (image) to the AGC 24.

The AGC 24 adjusts a gain of the pixel signal output from the imaging element 23. For example, the AGC 24 adjusts the gain of the pixel signal on the basis of the control by the light exposure controller 26. For example, the AGC 24 adjusts the gain (such as the voltage) so that the pixel signal is within an appropriate range. The AGC 24 outputs each pixel signal whose gain has been adjusted to the A/D converter 25.

The light exposure controller 26 is connected to the diaphragm 22 to control the aperture diameter of the diaphragm 22 and adjust the light quantity of the light reaching the imaging element 23. For example, when the imaging region is dark so that the light quantity of the collected light is low, the light exposure controller 26 changes the arrangement of each diaphragm fin 22*a* to increase the aperture diameter. In the manner, the light exposure controller 26 suppresses decrease in the light quantity of the light emitted to the imaging element 23. For example, when the imaging region is bright so that the light quantity of the collected light is high, the light exposure controller 26 changes the arrangement of each diaphragm fin 22*a* to decrease the aperture diameter. In the manner, the light exposure controller 26 suppresses increase in the light quantity of the light emitted to the imaging element 23.

The light exposure controller 26 is connected to the imaging element 23 to control the shutter speed of the electronic shutter and adjust the light exposure amount to the image sensor. For example, when the light quantity of the light reaching the imaging element 23 is high, the light exposure controller 26 increases the shutter speed to suppress the light exposure amount to the image sensor. Alternatively, for example, when the light quantity of the light reaching the imaging element 23 is low, the light exposure controller 26 decreases the shutter speed to increase the light exposure amount to the image sensor.

The light exposure controller 26 is connected to the AGC 24 to adjust the gain of the AGC 24. For example, the light exposure controller 26 adjusts the gain of the AGC 24 so that the voltage of the pixel signal is within an appropriate range. For example, when the voltage of the pixel signal whose gain is adjusted is larger than the appropriate range, the light exposure controller 26 decreases the gain of the AGC 24. When the voltage of the pixel signal whose gain is adjusted is smaller than the appropriate range, the light exposure controller 26 increases the gain of the AGC 24.

The A/D convertor 25 converts each pixel signal (analog signal), that is output from the AGC 24, to a digital signal. The A/D convertor 25 creates the image data on the basis of the digitally-converted pixel signals of all pixels. The A/D convertor 25 outputs the created image data to the image processor 30. Note that the imaging unit 20 may be used for the recognition of the surrounding state in order to avoid collision with the car running ahead.

The image processor 30 calculates the luminance for each pixel on the basis of the image data output from the imaging unit 20. The image processor 30 calculates the luminance for each pixel on the basis of the image data by, for example, estimating a "Y" value that is called luminous reflectance or luminous transmittance.

The luminance of each pixel depends on, for example, the aperture diameter of the diaphragm 22, the light exposure amount in the imaging element 23 and a setting value of the gain of the AGC 24. Therefore, the image processor 30 desirably previously acquire each piece of information of the aperture diameter of the diaphragm 22, the light exposure amount, and the setting value of the gain, and calculate the luminance for each pixel on the basis of these pieces of information and the luminance information. Note that it is desirable to appropriately adjust various parameters related to the calculation for the luminance so that the luminance of each pixel is substantially equivalent to a practical luminance. The image processor 30 creates the luminance information related to the luminance for each pixel, and outputs the created luminance information to the controller 40.

Note that the image processor 30 may be arranged in, for example, a place that is different from the illumination apparatus 10 of the vehicle 1. The image processor 30 may process not only the image data output from the imaging unit 20 but also other image data performed in the vehicle 1.

The controller 40 calculates the average luminance for each of the plurality of partial regions of the imaging region 20A from the image created by the imaging region 20A. To the illuminating unit 50, the controller 40 outputs information that is used to individually control each light quantity of the plurality of light sources of the illuminating unit 50.

As shown in FIG. 2, the controller 40 includes, for example, a computing unit 41; and a light-adjusting unit 46. As shown in FIG. 2, the computing unit 41 includes, for example, an average-luminance calculating unit 42; and a luminance-adjustment determining unit 43.

On the basis of the luminance information output from the image processor 30, the average-luminance calculating unit 42 calculates the average luminance of each of the partial regions forming the imaging region 20A. On the basis of the luminance information of all pixels forming one partial region, the average-luminance calculating unit 42 calculates the average luminance of this partial region. In the manner, the average-luminance calculating unit 42 calculates each average luminance of all the partial regions. To the luminance-adjustment determining unit 43, the average-luminance calculating unit 42 outputs the average luminance information related to the average luminance of each partial region.

On the basis of the average luminance information output from the average-luminance calculating unit 42, the luminance-adjustment determining unit 43 determines whether it is necessary to perform the luminance adjustment of the illumination light for each partial region. For example, on the basis of the average luminance information and a luminance threshold that is previously set for each partial region, the luminance-adjustment determining unit 43 determines whether it is necessary to perform the luminance adjustment of the illumination light. In this specification, the luminance threshold defines an upper limit of the average luminance of each partial region. For example, the luminance-adjustment determining unit 43 compares the average luminance and the luminance threshold for each partial region. If the average luminance exceeds the luminance threshold, the luminance-adjustment determining unit 43 determines that it is necessary to perform the luminance adjustment for the partial region that is the determination target. If the average luminance is equal to or lower than the luminance threshold, the luminance-adjustment determining unit 43 determines that it is unnecessary to perform the luminance adjustment for the partial region that is the determination target. To the light-adjusting unit 46, the luminance-adjustment determining unit 43 outputs the luminance adjustment determining information related to the luminance adjustment determining result for each partial region. Note that the luminance adjustment determining information may contain information related to the average luminance for each partial region.

Note that the illumination apparatus 10 may separately include a ranging sensor (not shown in the drawings) that measures a distance from the vehicle 1 to each partial region, and may set the luminance threshold for each partial region on the basis of the average luminance calculated by the average-luminance calculating unit 42 and the distance measured by the ranging sensor. For example, the illumination apparatus 10 may set a value of a luminance threshold of a partial region having a larger distance from the vehicle 1 to be lower than a value of a luminance threshold of a partial region having a smaller distance from the vehicle 1. For example, the illumination apparatus 10 may set a setting value of the luminance threshold so as to be in inverse proportion to the square of the distance from the vehicle 1. When the luminance threshold for each partial region is set as described above, a more appropriate luminance threshold is set in accordance with the dynamically-changing surrounding state.

Note that the luminance threshold according to the present embodiment is set to a value that meets the requirements described in, for example, the regulations (ECE112) of ECE (Economic Commission for Europe), Sections 6.2.4 and 6.3.3, etc.

The light-adjusting unit 46 adjusts the illumination light on the basis of the luminance adjustment determining information for each partial region output from the luminance-adjustment determining unit 43. For example, for a light source that illuminates a partial region for which it has been determined to perform the luminance adjustment, the light-adjusting unit 46 creates light-quantity setting information for adjusting the light quantity so that the luminance of this partial region is equal to or lower than the luminance threshold. The light-adjusting unit 46 may create, for example, the light-quantity setting information for making the light quantities that are different from one another for each light source or the light-quantity setting information for making the same light quantity among the plurality of light sources that illuminate the same partial region. The light-adjusting unit 46 outputs the created light-quantity setting information to the illuminating unit 50.

The illuminating unit 50 illuminates each partial region with a predetermined light quantity based on the result of the luminance adjustment by the controller 40. The illuminating unit 50 is arranged at, for example, a tip of the front side of the vehicle 1. As shown in FIG. 2, the illuminating unit 50 includes a light source unit 51, and a projection lens 52, etc. The light source unit 51 includes a plurality of light sources. Each light source is made of, for example, an LED or a semiconductor laser, etc. In the light source unit 51, the plurality of light sources are arranged in, for example, an array form. For example, each light source may be arranged so as to correspond to each of the partial regions of the imaging region 20A shown in FIG. 1(b). For example, one light source may correspond to one partial region, or a plurality of light sources may correspond to one partial region.

The light source unit 51 individually or independently adjusts the light quantity of each light source on the basis of the light-quantity setting information output from the controller 40. For example, in a light source that illuminates a partial region having the higher average luminance than the luminance threshold, the light quantity is reduced so that the average luminance of this partial region is equal to or lower than the luminance threshold. In a light source that illuminates a partial region having the lower average luminance than the luminance threshold, note that the light quantity may be increased as long as the average luminance of this partial region is equal to or lower than the luminance threshold. The average luminance of each partial region after the light adjustment is distributed as shown in, for example, FIG. 1(c). In FIG. 1(c), note that the partial region whose average luminance has been already adjusted is shown with oblique lines. And, a thickness of the oblique line indicates the average luminance obtained after the light adjustment. For example, the thicker the oblique line is, the lower the average luminance of the partial region is.

For example, the luminances of the partial regions Db, Ga, and Hc obtained after the light adjustment are almost the same as one another. The luminances of the partial regions Db, Ga, and Hc obtained after the light adjustment are higher than the luminance of the partial region Bc. The luminance of the partial region Bc obtained after the light adjustment is higher than the luminance of the partial region Cc. The luminance of the partial region Cc obtained after the light adjustment is higher than the luminance of the partial region Cb. The luminance of the partial region Cb obtained after the light adjustment is higher than the luminance of the partial region Dc.

The projection lens 52 is made of one or a plurality of lenses. The projection lens 52 collects the illumination light output from each light source of the light source unit 51. As shown in FIG. 1(a), the imaging lens 52 projects the collected illumination light in a predetermined direction in front of the vehicle 1.

In the illumination apparatus 10, note that a plurality of illuminating units 50 may be arranged. For example, each of the illuminating units 50 may be arranged on right and left of the tip of the front side of the vehicle 1. In this case, the controller 40 adjusts the average luminance of the partial region by performing the luminance adjustment in each illuminating unit 50.

Note that the imaging unit 2 may take the image when the illuminating unit 50 is controlled to be turned on and off in time division, for example, to be instantaneously turned off. In the manner, the imaging unit 20 can take the image without direct entering of the illumination light from the illuminating unit 50. In the manner, influence of the illumination light on the image data is suppressed, so that a correct luminance for each pixel is calculated.

For example, the illuminating unit 50 can illuminate the object at a wide angle in the horizontal direction (X-axis direction), and therefore, it is desirable to allow the imaging unit 20 to take the image at a wide angle so as to include an illumination range of the illuminating unit 50. Generally, the projection lens 52 has distortion. Therefore, for example, when the projection lens 52 has so-called pincushion distortion, a region corresponding to the partial region on the image is smaller than a practical partial region, and therefore, it is desirable to set, for example, an area of the partial region shown in FIGS. 1(b) and (c) to be larger as a region has a wider angle.

On the other hand, when the projection lens 52 has so-called barrel distortion, a region corresponding to the partial region on the image is larger than a practical partial region, and therefore, it is desirable to set an area of the partial region shown in FIGS. 1(b) and (c) to be smaller as a region has a wider angle.

<Light-Adjusting Method of Illumination Apparatus>

Figure 3:
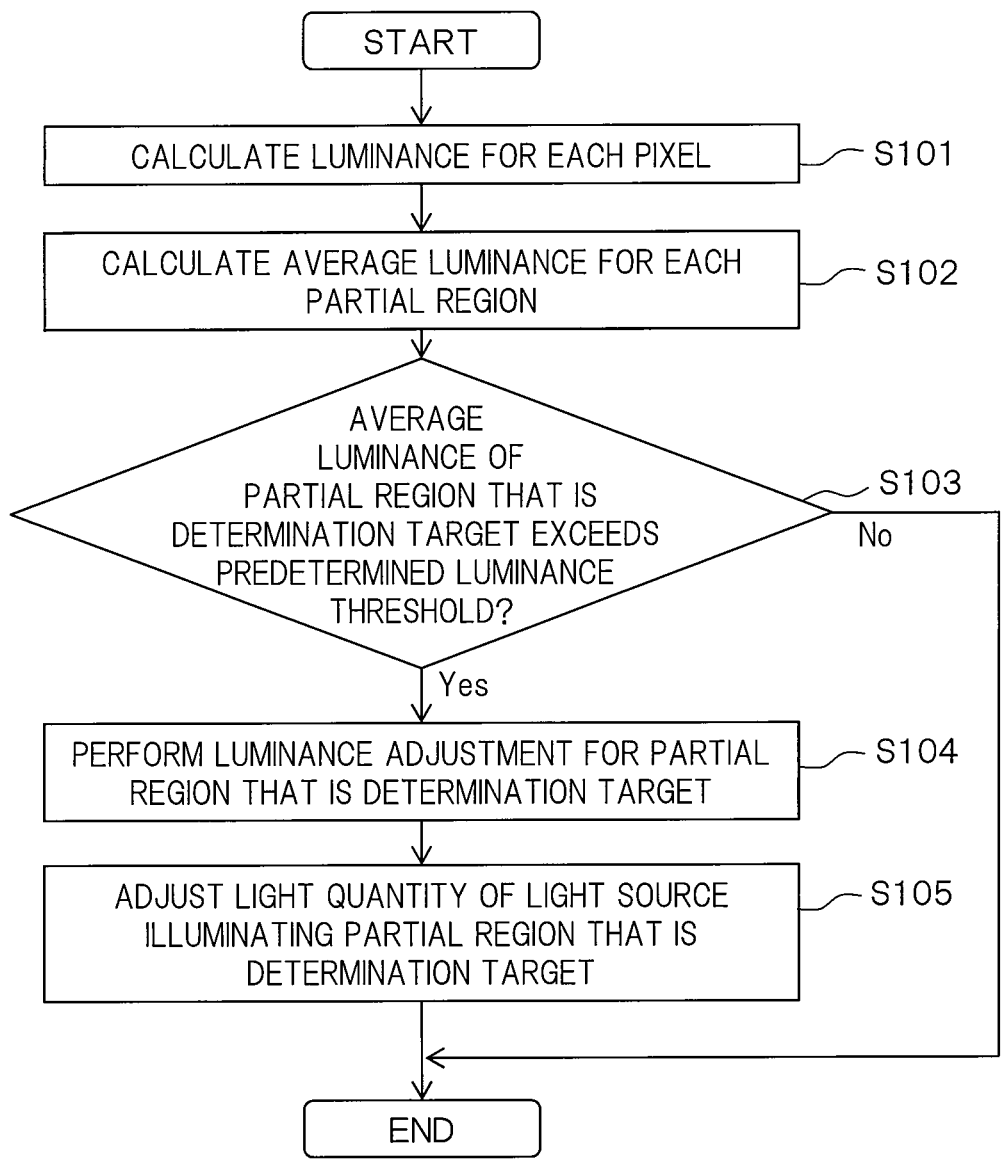
FIG. 3 is a flowchart showing one example of a light-adjusting method of the illumination apparatus according to the first embodiment of the present invention.

Next, a light-adjusting method of the illumination apparatus according to the present embodiment will be described. FIG. 3 is a flowchart showing one example of the light-adjusting method of the illumination apparatus according to the first embodiment of the present invention. In the present embodiment, as shown in FIG. 3, the luminance adjustment for each partial region is performed by each process of the steps S101 to S105.

First, in the step (first step) A101, the image processor 30 acquires the luminance information for each pixel on the basis of the image data output from the imaging unit 20. For example, the imaging element 23 takes an image of the region in front of the vehicle 1 as shown in FIG. 1(b). To the AGC 24, the imaging element 23 outputs a pixel signal for each pixel related to the imaged scenery. The AGC 24 adjusts a gain of the pixel signal, and outputs the pixel signal, whose gain has been adjusted, to the A/D converter 25. The A/D converter 25 digitalizes the pixel signal whose gain has been adjusted, and creates the image data. The A/D converter 25 outputs the created image data to the image processor 30.

The image processor 30 calculates the luminance of each pixel on the basis of the image data output from the A/D converter 25. The image processor 30 creates the luminance information related to the calculated luminance of each pixel, and outputs the luminance information to the controller 40.

In the step (second step) S102, the controller 40 calculates the average luminance of each partial region of the imaging region 20A. For example, the average-luminance calculating unit 42 of the computing unit 41 calculates the average luminance of each partial region of the imaging region 20A on the basis of the luminance information output from the image processor 30. The average-luminance calculating unit 42 extracts the luminances of all the pixels forming one partial region from the luminance information, and calculates the average luminance of this partial region on the basis of the extracted luminance of each pixel. The average-luminance calculating unit 42 calculates, for example, the average luminance of each of all the partial regions (32 partial regions) shown in FIG. 1(*b*). To the luminance-adjustment determining unit 43, the average-luminance calculating unit 42 outputs the average-luminance information related to the calculated average luminance.

In the step (third step) S103, on the basis of the average information, the controller 40 determines whether it is necessary to perform the luminance adjustment for each partial region. First, the luminance-adjustment determining unit 43 of the computing unit 41 determines whether the average luminance of each partial region exceeds the predetermined luminance threshold. The information related to the luminance threshold is stored in, for example, a data storage not illustrated in the drawings, and the luminance-adjustment determining unit 43 reads out the information related to the luminance threshold from the data storage. Note that the luminance threshold may be in common among all the partial regions.

On the basis of the average-luminance information output from the average-luminance calculating unit 42 and the luminance threshold, the luminance-adjustment determining unit 43 determines whether it is necessary to perform the luminance adjustment for each partial region. For example, the luminance-adjustment determining unit 43 determines (Yes) that it is necessary to perform the luminance adjustment for the partial region whose average luminance exceeds the luminance threshold. Alternatively, the luminance-adjustment determining unit 43 determines (No) that it is unnecessary to perform the luminance adjustment for the partial region whose average luminance is equal to or lower than the luminance threshold.

In the example shown in FIG. 1, the average luminances of the partial regions Bc, Cb, Cc, Db, Dc, Ga and Hc exceed the luminance threshold as shown in FIG. 1(*c*), the luminance-adjustment determining unit 43 determines that it is necessary to perform the luminance adjustment for each of these partial regions. And, the luminance-adjustment determining unit 43 determines that it is unnecessary to perform the luminance adjustment for other partial regions than these partial regions. To the light-adjusting unit 46, the luminance-adjustment determining unit 43 outputs the luminance-adjustment determining information related to the luminance-adjustment determining result for each partial region. As shown in FIG. 3, the process of the step S104 is performed to the partial region for which it has been determined that it is necessary to perform the luminance adjustment.

In the step (fourth step) S104, on the basis of the luminance-adjustment determining information, the controller 40 performs the luminance adjustment to the partial region for which it has been determined that it is necessary to perform the luminance adjustment. For example, the light-adjusting unit 46 sets the average luminance after the light adjustment for the partial region that is the determination target. The light-adjusting unit 46 sets the light quantity for the light source that illuminates the partial region that is the determination target. For example, for the light source that illuminates the partial region for which it has been determined that it is necessary to perform the luminance adjustment, the light-adjusting unit 46 creates light-quantity setting information for decreasing the light quantity so that the luminance of the partial region is equal to or lower than the luminance threshold. The light-adjusting unit 46 outputs the created light-quantity setting information to the illuminating unit 50.

In the step (fifth step) S105, the illuminating unit 50 adjusts the light quantity of the light source of the light source unit 51 on the basis of the light-quantity setting information output from the controller 40. For example, the light source unit 51 of the illuminating unit 50 decreases the light quantity of the light source on the basis of the light-quantity setting information output from the light-adjusting unit 46. The light source illuminates each partial region with a light quantity that is adjusted on the basis of the light-quantity setting information. Then, the average luminance of each partial region becomes equal to or lower than the predetermined luminance threshold. In the example of FIG. 1(*c*), the average luminances of the partial regions Ba, Bb, Bd and Fd after the light adjustment are almost the same as one another. The average luminances of the partial regions Db, Ga and Hc after the light adjustment are almost the same as one another. The average luminances of the partial regions Ba, Bb, Bd and Fd after the light adjustment are higher than the average luminances of the partial regions Db, Ga and Hc after the light adjustment. The average luminances of the partial regions Db, Ga and Hc after the light adjustment are higher than the average luminance of the partial region Bc after the light adjustment. The average luminance of the partial region Bc after the light adjustment is higher than the average luminance of the partial region Cc after the light adjustment. The average luminance of the partial region Cc after the light adjustment is higher than the average luminance of the partial region Cb after the light adjustment. The average luminance of the partial region Cb after the light adjustment is higher than the average luminance of the partial region Dc after the light adjustment.

On the other hand, it is determined in the step S103 that it is unnecessary to perform the luminance adjustment, the light-adjusting unit 46 does not adjust the light quantity of the light source that illuminates this partial region as shown in FIG. 3. At this time, the light-adjusting unit 46 does not create the light-quantity setting information related to the light source that illuminates this partial region. Alternatively, the light-adjusting unit 46 may create the light-quantity setting information for maintaining the light quantity of the light source that illuminates this partial region, and output the created light-quantity setting information to the illuminating unit 50. Therefore, the light quantity of the light source that illuminates this partial region illuminates it without adjusting the light quantity.

Figure 4:
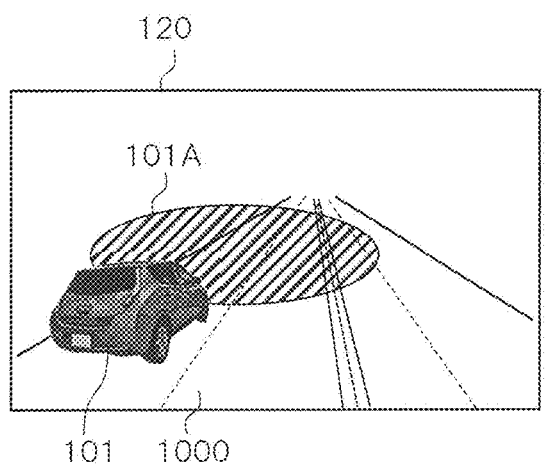
FIG. 4 is a schematic diagram showing another example of the light-adjusting method of the illumination apparatus according to the first embodiment of the present invention.
Figure 4:
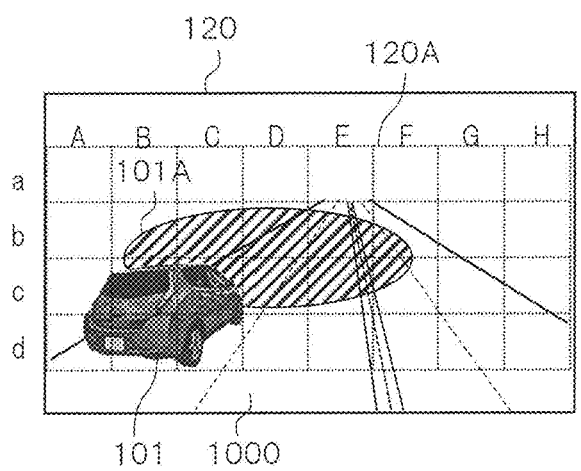
Figure 4:
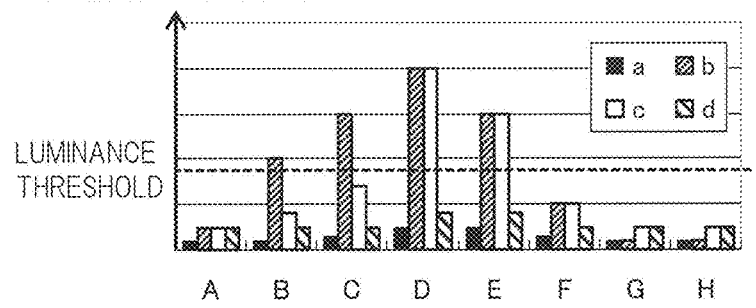
Figure 4:
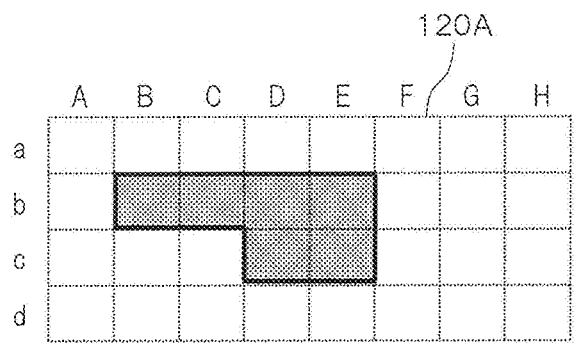

When the car running ahead is running in front of the vehicle 1, the illumination apparatus 10 may adjust the light in consideration of the illumination light of the car running ahead. FIG. 4 is a schematic diagram showing another example of the light-adjusting method of the illumination apparatus according to the first embodiment of the present invention. FIG. 4(a) is a diagram showing scenery 120 in front of the vehicle 1. FIG. 4(b) is a diagram showing an imaging region 120A of the scenery 120. FIG. 4(c) is a diagram showing one example of the average luminance for each partial region. FIG. 4(d) is a diagram showing the partial region for which the luminance adjustment is performed.

In the step S101, as shown in FIG. 4(a), the imaging element 23 takes an image of scenery 120 including an illumination region 101A of a car 101 running ahead in front of the vehicle. The image processor 30 calculates the luminance of each pixel of the image data including the illumination region 101A.

In the step S102, the average-luminance calculating unit 42 calculates, for example, the average luminance of each partial region forming the imaging region 120A shown in FIG. 4(b) on the basis of the luminance information output from the image processor 30.

In the step S103, the luminance-adjustment determining unit 43 determines whether it is necessary to perform the luminance adjustment for each partial region of the imaging region 120A. For example, FIG. 4(c) shows the average luminance of each partial region. Among the partial regions of the imaging region 120A, for example, the average luminances of the partial regions Bb, Cb, Db, Dc, Eb and Ec exceed the luminance threshold as shown in FIG. 4(c). Therefore, the luminance-adjustment determining unit 43 determines that it is necessary to perform the luminance adjustment for these partial regions. Note that these partial regions are, for example, regions largely affected by the illumination of the car 101 running ahead.

In the step S104, the light-adjusting unit 46 adjusts the light for the partial region Bb, Cb, Db, Dc, Eb and Ec shown in FIG. 4(d).

Effects According to Present Embodiment

According to the present embodiment, the controller 40 calculates the average luminance of each partial region of the imaging regions 20A and 120A formed of the plurality of partial regions on the basis of the luminance of each pixel, determines whether it is necessary to perform the luminance adjustment for each partial region on the basis of the average luminance and the luminance threshold, and perform the luminance adjustment for the partial region on the basis of the determination result of the luminance adjustment. According to this configuration, the light quantity of the light source that illuminates each partial region is adjusted on the basis of the determination result of the luminance adjustment, and therefore, the luminance for each partial region can be appropriately adjusted. In this manner, even in the state of the dynamically-changing surrounding luminance, the luminance of the imaging regions 20A and 120A can be appropriately adjusted.

According to the present embodiment, when the average luminance of the partial region that is the determination target exceeds the luminance threshold, the controller 40 determines that it is necessary to perform the luminance adjustment for the partial region that is the determination target, and performs the luminance adjustment so that the average luminance of the partial region that is the determination target is equal to or lower than the luminance threshold. According to this configuration, even when the average luminance of the partial region exceeds the luminance threshold, the luminance is adjusted to be equal to or lower than the luminance threshold, and therefore, the luminance for each partial region can be appropriately adjusted. In this manner, even when the surrounding luminance increases, the luminance of the imaging regions 20A and 120A can be appropriately adjusted.

According to the present embodiment, the controller 40 creates the light-quantity setting information for adjusting the light quantity of each light source that illuminates the partial region that is the determination target, and the illuminating unit 50 adjusts the light quantity of each light source on the basis of the light-quantity setting information. According to this configuration, the light quantity is set for each light source, and therefore, the luminance of the partial region can be more finely adjusted.

According to the present embodiment, the luminance threshold of each partial region is set on the basis of the distance measured by the ranging sensor. According to this configuration, the more appropriate luminance threshold is set in accordance with the state of the imaging region 20, and therefore, the luminance can be more appropriately adjusted for each partial region.

According to the present embodiment, the luminance threshold of each partial region is set to a value in inverse proportion to the square of the distance measured by the ranging sensor. According to this configuration, the influence of the diffusion of the light from each partial region is considered, and therefore, the luminance threshold for each partial region can be more appropriately set.

According to the present embodiment, the controller 40 calculates the average luminance for each of the plurality of partial regions of the imaging regions 20A and 120A from the image created by the imaging unit 20, and outputs the information for individually controlling the light quantities of the plurality of light sources of the illuminating unit 50, to the illuminating unit 50. According to this configuration, the light quantities of the plurality of light sources are individually controlled, and therefore, the luminance of each partial region can be appropriately adjusted. In this manner, even in the state of the dynamically-changing surrounding luminance, the luminance of the imaging regions 20A and 120A can be appropriately adjusted.

Second Embodiment

Next, a second embodiment of the present invention will be described. A section of the second embodiment will describe a case of determination whether it is necessary to perform the luminance adjustment for the partial region by using a different method from that of the above-described embodiment. Note that description of parts overlapped with those of the above-described embodiment will be omitted in principle below.

Figure 5:
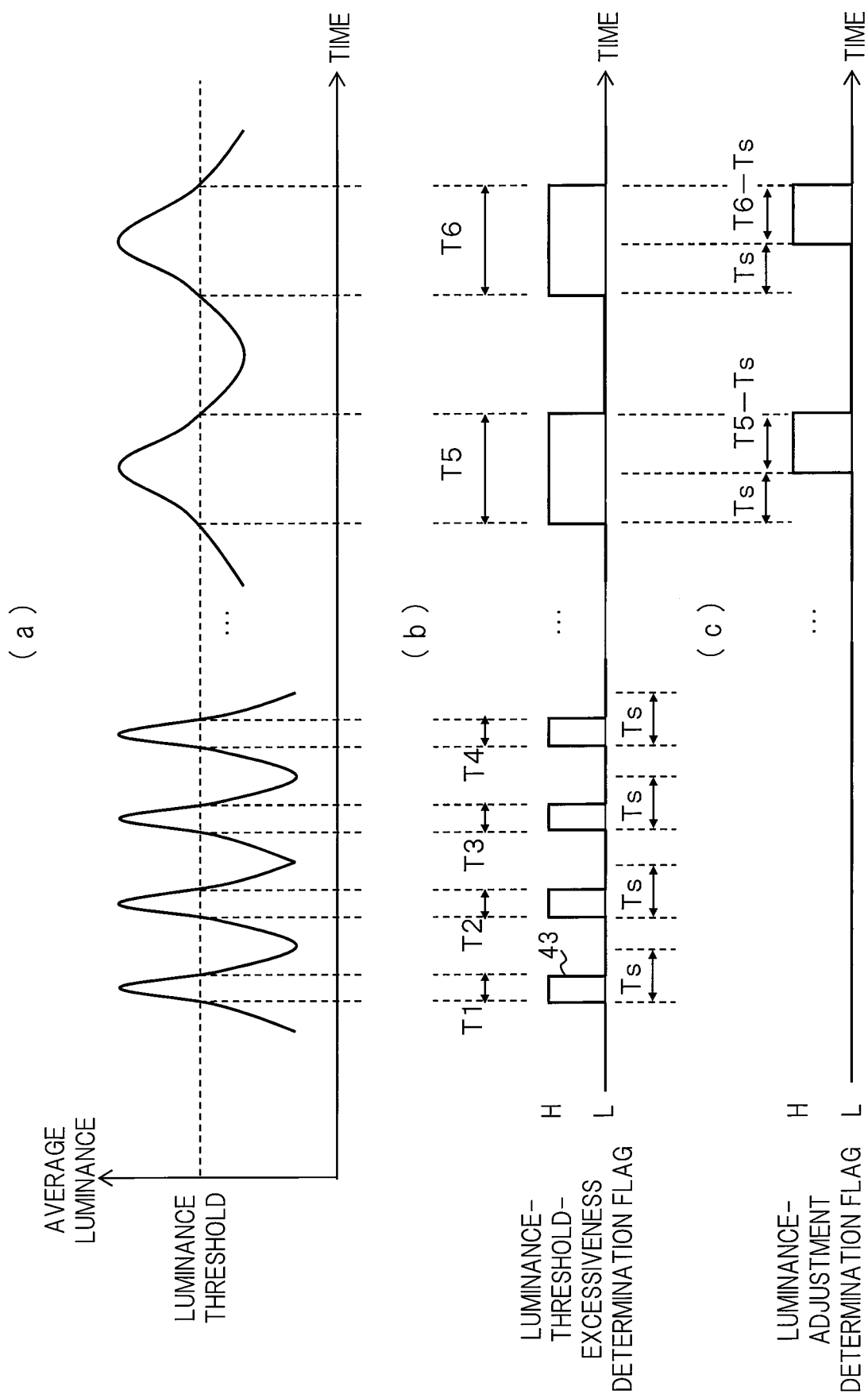
FIG. 5 is a schematic diagram showing one example of a method of determining whether it is necessary to luminance adjustment for a partial region according to a second embodiment of the present invention.

FIG. 5 is a schematic diagram showing one example of the method of determining whether it is necessary to perform the luminance adjustment for the partial region according to the second embodiment of the present invention. FIG. 5(a) is a diagram showing one example of temporal change of a calculated average luminance. FIG. 5(b) is a diagram showing a result of determination whether the average luminance exceeds the luminance threshold. FIG. 5(c) is a diagram showing one example of a result of determination whether it is necessary to perform the luminance adjustment for the partial region.

The light-adjusting method of the illumination apparatus according to the present embodiment is performed so as to follow the flowchart of FIG. 3 described above. In the step S101, when the image data is output to the image processor 30, imaging-time information related to time at which the image has been taken by the imaging unit 20 is output together. Note that the imaging-time information may be contained in the image data. The image processor 30 outputs the created luminance information and imaging-time information to the controller 40. Note that the imaging unit 20 may output the imaging-time information to the controller 40.

In the step S102, the average-luminance calculating unit 42 outputs the calculated average-luminance information and imaging-time information to the luminance-adjustment determining unit 43. In the manner, the controller 40 acquires the imaging-time information.

In the step S103, first, the luminance-adjustment determining unit 43 determines whether the average luminance of each partial region exceeds a predetermined luminance threshold. More specifically, on the basis of temporal change of the average luminance shown in FIG. 5(a), the luminance-adjustment determining unit 43 detects time during which the average luminance of the partial region exceeds the luminance threshold. As shown in FIG. 5(b), the luminance-adjustment determining unit 43 creates a luminance-threshold-excessiveness determination flag related to the result of the determination whether the average luminance exceeds the predetermined luminance threshold. For example, when the average luminance exceeds the predetermined luminance threshold, the luminance-adjustment determining unit 43 creates a high-level luminance-threshold-excessiveness determination flag as shown in FIG. 5(b). On the other hand, when the average luminance is equal to or lower than the predetermined luminance threshold, the luminance-adjustment determining unit 43 creates a low-level luminance-threshold-excessiveness determination flag as shown in FIG. 5(b).

On the basis of the acquired imaging-time information, the controller 40 detects luminance-threshold exceeding time during which the average luminance of the partial region exceeds the luminance threshold. For example, the average-luminance calculating unit 42 detects the luminance-threshold exceeding time on the basis of a plurality of pieces of the luminance information and a plurality of pieces of the imaging-time information. Each of symbols "T1" to "T6" shown in FIG. 5(b) indicates the luminance-threshold exceeding time. Each of the luminance-threshold exceeding time T1 to T4 corresponds to a case of rapid change of the average luminance, and each of the luminance-threshold exceeding time T5 and T6 corresponds to a case of gentle change of the average luminance. Therefore, each of the luminance-threshold exceeding time T1 to T4 is shorter than each of the luminance-threshold exceeding time T5 and T6.

On the basis of the luminance-threshold exceeding time (for example, T1 to T6) and predetermined standby time Ts, the controller 40 determines whether it is necessary to perform the luminance adjustment for each partial region. For example, when the luminance-threshold exceeding time of the luminance-threshold-excessiveness determination flag exceeds the predetermined standby time Ts, the luminance-adjustment determining unit 43 determines that it is necessary to perform the luminance adjustment for the partial region that is the determination target. At this time, as shown in FIG. 5(c), the luminance-adjustment determining unit 43 creates a high-level luminance-adjustment determination flag. For example, since each of the luminance-threshold exceeding time T5 and T6 shown in FIG. 5(b) exceeds the standby time Ts, the luminance-adjustment determining unit 43 creates the high-level luminance-adjustment determination flag at each time ("T5-Ts", "T6-Ts"). At the time ("T5-Ts", "T6-Ts"), the luminance adjustment for the partial region that is the determination target is performed by the process of the step S104 as shown in FIG. 3.

On the other hand, when the luminance-threshold exceeding time of the luminance-threshold-excessiveness determination flag is equal to or shorter than the predetermined standby time Ts, the luminance-adjustment determining unit 43 determines that it is unnecessary to perform the luminance adjustment for the corresponding partial region. At this time, as shown in FIG. 5(c), the luminance-adjustment determining unit 43 creates a low-level luminance-adjustment determination flag. For example, since each of the luminance-threshold exceeding time T1 to T4 shown in FIG. 5(b) is equal to or shorter than the predetermined standby time Ts, the luminance-adjustment determining unit 43 creates the low-level luminance-adjustment determination flag even at each of the time T1 to T4. As shown in FIG. 3, at each of the time T1 to T4, the luminance adjustment is not performed for the partial region that is the determination target.

To the light-adjusting unit 46, the luminance-adjustment determining unit 43 outputs the information related to the created luminance-adjustment determination flag as the luminance-adjustment determination information.

Note that the standby time Ts is preferably set so that the increase/decrease of the light quantity (or the flashing) of the illumination light is not mistaken for the flashing of the passing light or the hazard lamp. For example, the standby time Ts is desirably set to be longer than an interval (such as 0.5 to 1 seconds) of the flashing of the hazard lamp, and is more desirably set to be, for example, equal to or longer than 1 second.

In the step S104, the controller 40 sets the average luminance obtained after the light adjustment for each partial region on the basis of the luminance-adjustment determination flag output as the luminance-adjustment determination information. For example, the light-adjusting unit 46 sets the average luminance obtained after the light adjustment for the partial region having the high-level luminance-adjustment determination flag.

In the step S105, the same process as that of the step S105 of the above-described first embodiment is performed, and therefore, the detailed description is omitted here.

According to the present embodiment, the following effects are obtained in addition to the effects of the above-described embodiment. For example, according to the present embodiment, the controller 40 detects the luminance-threshold exceeding time that is the time during which the average luminance exceeds the luminance threshold on the basis of the imaging-time information, and determines whether it is necessary to perform the luminance adjustment for each partial region on the basis of the luminance-threshold exceeding time and the predetermined standby time Ts. When the luminance-threshold exceeding time of the partial region that is the determination target exceeds the standby time Ts, the controller 40 determines that it is necessary to perform the luminance adjustment for this partial region that is the determination target. According to this configuration, the luminance adjustment is performed for the partial region that is the determination target after the luminance-threshold exceeding time exceeds the standby time Ts, and therefore, the rapid luminance change of the partial region can be suppressed.

Third Embodiment

Next, a third embodiment of the present invention will be described. The section of the above-described second embodiment has described that the luminance adjustment is performed for the partial region when the luminance-threshold exceeding time exceeds the standby time Ts. However, when the luminance-threshold exceeding time slightly exceeds the standby time Ts, the partial region is possibly dimmed during only short time Δt, and then, brightened. In order to avoid such rapid luminance change, it is desirable to maintain the dimmed state during a certain time of period after the partial region is dimmed. Accordingly, a section of the present embodiment will describe an illumination apparatus that determines whether it is necessary to perform the luminance adjustment by anticipating the luminance change of the partial region. Note that description of parts overlapped with those of the above-described embodiments will be omitted in principle below.

Figure 6:
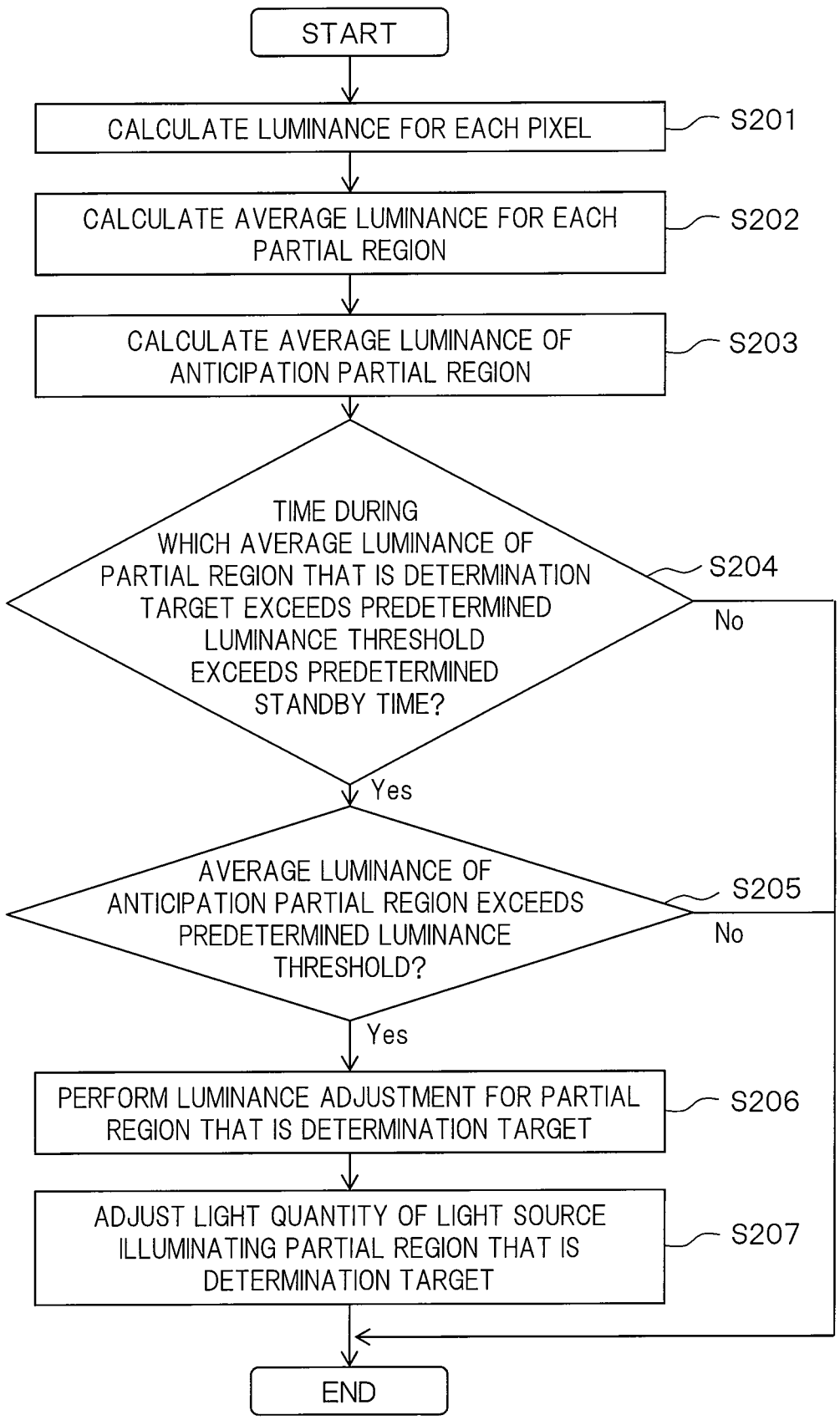
FIG. 6 is a flowchart showing one example of a light-adjusting method of an illumination apparatus according to a third embodiment of the present invention.
Figure 7:
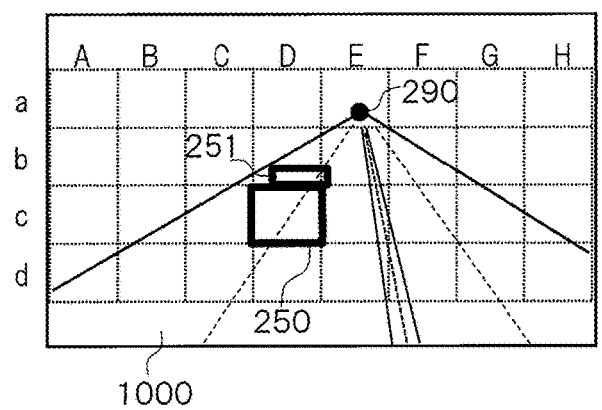
FIG. 7 is a schematic diagram showing one example of the light-adjusting method of the illumination apparatus according to the third embodiment of the present invention.
Figure 7:
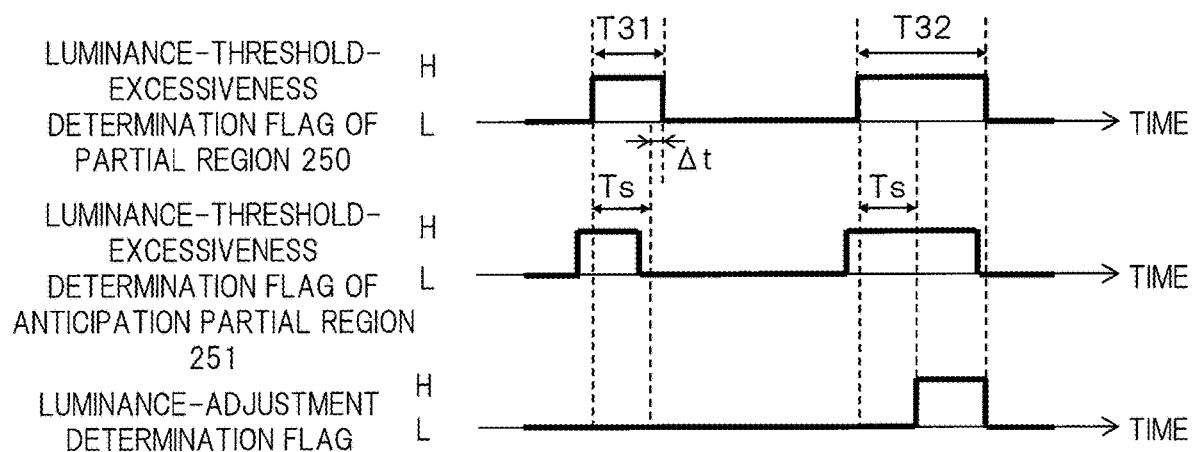

FIG. 6 is a flowchart showing one example of a light-adjusting method of the illumination apparatus according to the third embodiment of the present invention. FIG. 7 is a schematic diagram showing one example of the light-adjusting method of the illumination apparatus according to the third embodiment of the present invention. FIG. 7(a) is a diagram showing one example of the partial region that is the determination target for the luminance adjustment. FIG. 7(b) is a diagram showing one example of an anticipation partial region where the change of the average luminance of the partial region that is the determination target is used for anticipation. FIG. 7(c) is a diagram showing one example of a determination result of the average luminance of the partial region that is the determination target, a determination result of the average luminance of the anticipation partial region, and a determination result related to the luminance adjustment for the partial region that is the determination target. In the present embodiment, as shown in FIG. 6, the illumination light output from the illumination apparatus is adjusted in steps S201 to S207.

In the steps S201 to S202, the same processes as those of the above-described steps S101 to S102 are performed. Therefore, the detailed description is omitted here.

In the step (sixth step) S203, the controller 40 calculates an average luminance of an anticipation partial region 251 used for anticipating the luminance change of each partial region 250 shown in FIG. 7(a). For example, the average-luminance calculating unit 42 calculates the average luminance of the anticipation partial region 251 on the basis of the luminance information output from the image processor 30. To the luminance-adjustment determining unit 43, the average-luminance calculating unit 42 outputs the average-luminance information related to the calculated average luminance of the anticipation partial region 251.

The anticipation partial region 251 is, for example, a region in vicinity of the partial region 250. For example, as the anticipation partial region 251, a region forming the partial region 250 at a later stage (for example, immediately after present time) is selected. For example, as the anticipation partial region 251, an upper right region in contact with the partial region 250 is selected as shown in FIG. 7(a).

The controller 40 determines whether it is necessary to perform the luminance adjustment for the partial region 250 that is the determination target on the basis of the luminance-threshold exceeding time of the partial region 250 that is the determination target, the standby time Ts, and the average luminance of the anticipation partial region 251 obtained when the luminance-threshold exceeding time exceeds the standby time.

First, in the step S204, the controller 40 determines whether the time during which the average luminance of the partial region 250 that is the determination target exceeds the predetermined luminance threshold exceeds the predetermined standby time. For example, when the average luminance of the partial region 250 that is the determination target exceeds the predetermined luminance threshold as shown in FIG. 7(b), the luminance-adjustment determining unit 43 creates the high-level luminance-threshold-excessiveness determination flag. On the other hand, when the average luminance of the partial region 250 that is the determination target is equal to or lower than the predetermined luminance threshold as shown in FIG. 7(b), the luminance-adjustment determining unit 43 creates the low-level luminance-threshold-excessiveness determination flag.

The luminance-adjustment determining unit 43 determines whether the luminance-threshold exceeding time of the luminance-threshold-excessiveness determination flag of the partial region 250 exceeds the predetermined standby time Ts. For example, when it is determined (Yes) that the luminance-threshold exceeding time of the partial region 250 exceeds the predetermined standby time Ts, a process of the step S205 is performed as shown in FIG. 6. On the other hand, when it is determined (No) that the luminance-threshold exceeding time of the partial region 250 is equal to or shorter than the predetermined standby time Ts, the luminance adjustment for the partial region 250 that is the determination target is not performed as shown in FIG. 6. In the example of FIG. 7(b), note that both of the luminance-threshold exceeding time T31, T32 exceed the standby time Ts, and therefore, the process of the step S205 is performed in both cases.

In the step (seventh step) S205, when the luminance-threshold exceeding time of the partial region 250 that is the determination target exceeds the predetermined standby time Ts, the controller 40 determines whether the average luminance of the anticipation partial region 251 exceeds the predetermined luminance threshold.

For example, on the basis of the luminance-threshold-excessiveness determination flag of the anticipation partial region 251 shown in FIG. 7(b), the luminance-adjustment determining unit 43 determines whether the average luminance of the anticipation partial region 251 obtained when the luminance-threshold exceeding time of the partial region 250 that is the determination target is equal to the predetermined standby time Ts exceeds the predetermined luminance threshold.

For example, (Yes) when the luminance-threshold exceeding time of the partial region 250 that is the determination target exceeds the predetermined standby time Ts as well as when the average luminance of the anticipation partial region 251 obtained when the luminance-threshold exceeding time of the partial region 250 that is the determination target exceeds the predetermined standby time Ts exceeds the luminance threshold, the luminance-adjustment determining unit 43 determines that it is necessary to perform the luminance adjustment for the partial region 250 that is the determination target. At this time, as shown in FIG. 7(b), the luminance-adjustment determining unit 43 creates the high-level luminance-adjustment determination flag, and outputs the created luminance-adjustment determination flag as the luminance-adjustment determining information to the light-adjusting unit 46. Then, as shown in FIG. 6, a process of the step S206 is performed.

On the other hand, (No) when the average luminance of the anticipation partial region 251 obtained when the luminance-threshold exceeding time of the partial region 250 that is the determination target exceeds the predetermined standby time Ts is equal to or lower than the luminance threshold, the luminance-adjustment determining unit 43 determines that it is unnecessary to perform the luminance adjustment for the partial region 250 that is the determination target. At this time, as shown in FIG. 7(b), the luminance-adjustment determining unit 43 creates the low-level luminance-adjustment determination flag, and outputs the created luminance-adjustment determination flag as the luminance-adjustment determining information to the light-adjusting unit 46. In this case, as shown in FIG. 6, the light adjustment for the partial region 250 that is the determination target is not performed.

In the step S206, the same processes as those of the step S104 of the above-described second embodiment are performed. Therefore, the detailed description is omitted here.

In the step S207, the same processes as those of the step S105 of the above-described second embodiment are performed. Therefore, the detailed description is omitted here.

Note that a size of the anticipation partial region 251 may be appropriately set in accordance with how long the anticipation is performed. If an area is widely set toward a disappearance point 290 shown in FIG. 7(a), an average luminance of a region that is correspondingly far can be detected, so that the time for the anticipation can be lengthened.

According to the present embodiment, the following effects are obtained in addition to the effects of the above-described embodiments. For example, according to the present embodiment, the controller 40 calculates the average luminance of the anticipation partial region 251, and determines whether it is necessary to perform the luminance adjustment for the partial region 250 that is the determination target on the basis of the luminance-threshold exceeding time of the partial region 250 that is the determination target, the standby time Ts, and the average luminance of the anticipation partial region 251 obtained when the luminance-threshold exceeding time exceeds the standby time. When the luminance-threshold exceeding time of the partial region 250 that is the determination target exceeds the standby time Ts as well as when the average luminance of the anticipation partial region 251 obtained when the luminance-threshold exceeding time of the partial region 250 that is the determination target exceeds the standby time Ts exceeds the luminance threshold, the controller 40 determines that it is necessary to perform the luminance adjustment for the partial region 250 that is the determination target. According to this configuration, as the anticipation result of the luminance change, when it is determined that the luminance-threshold exceeding time is short after exceeding the standby time Ts, the luminance adjustment for the partial region 250 is not performed, and therefore, the rapid luminance change of the partial region can be more suppressed.

Note that a ranging sensor not shown in the drawings may be separately arranged to allow the controller 40 or others to determine, for example, whether a distance to the anticipation partial region 251 is larger than that to the partial region 250. After such determination has been made, for example, the controller 40 may adjust the light as shown in FIG. 7. The information of the distances to the partial region 250 and the anticipation partial region 251 is acquired by the ranging sensor, and the controller 40 determines whether the anticipation partial region 251 is farther than the partial region 250, so that the anticipation accuracy is improved.

Fourth Embodiment

Next, a fourth embodiment of the present invention will be described. The imaging unit 20 and the illuminating unit 50 are arranged at positions at which they are far from each other in many cases. Therefore, an optical axis of the imaging unit 20 and an optical axis of the illuminating unit 50 do not match each other, disparity is caused between the imaging unit 20 and the illuminating unit 50, and mismatch is caused between an imaging region of the image and a practical imaging region. In this case, there is a risk of mismatch in the luminance adjustment between the partial regions.

Figure 8:
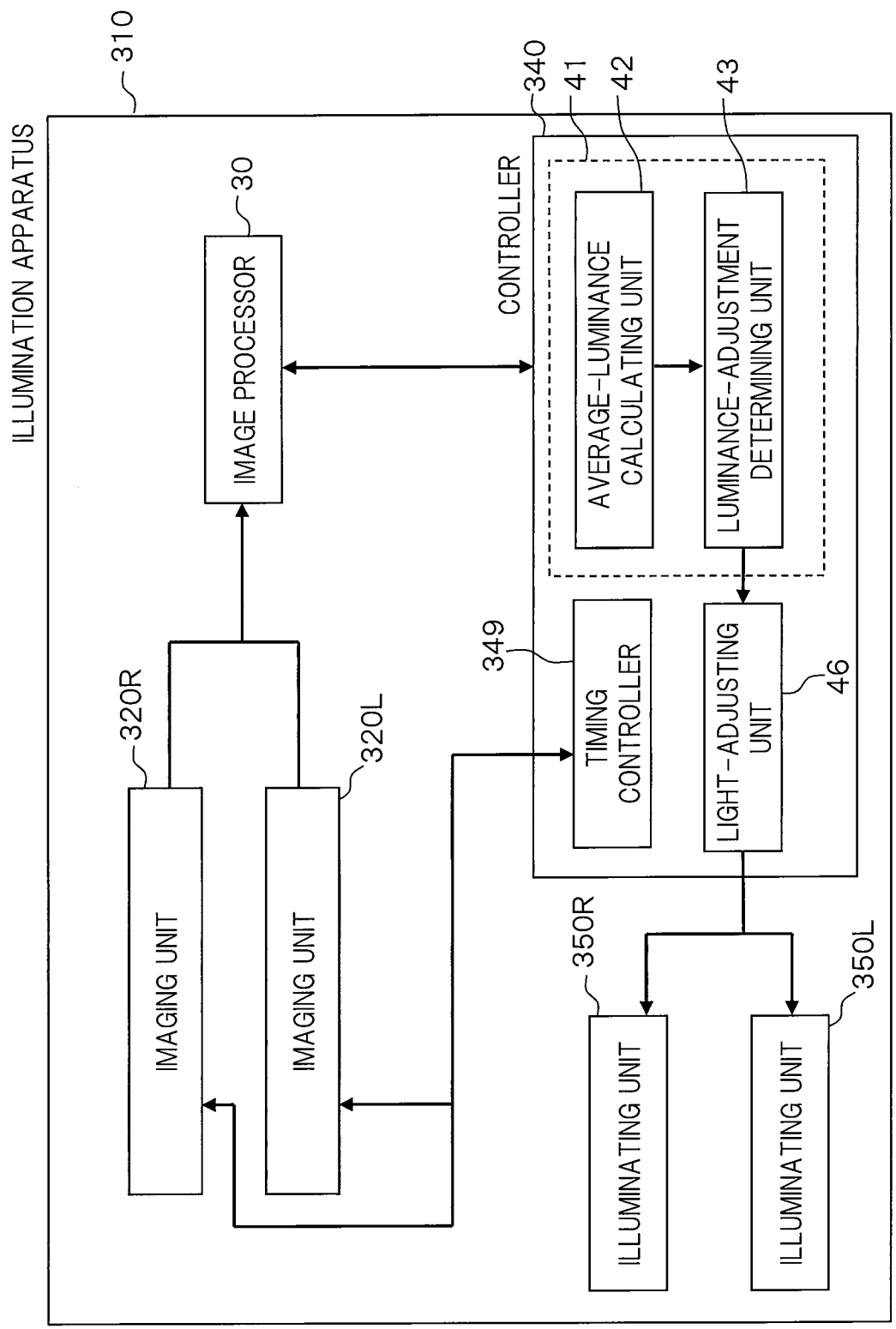
FIG. 8 is a diagram showing one example of a configuration of an illumination apparatus according to a fourth embodiment of the present invention.

Accordingly, in the present embodiment, an illumination apparatus that suppresses such mismatch in the luminance adjustment will be described. Note that description of parts overlapped with those of the above-described embodiments will be omitted in principle below. FIG. 8 is a diagram showing one example of a configuration of the illumination apparatus according to the fourth embodiment of the present invention. In the present embodiment, the illumination apparatus includes a plurality of illuminating units and a plurality of imaging units. For example, as shown in FIG. 8, an illumination apparatus 310 includes, for example, imaging units 320R and 320L, an image controller 30, a controller 340, and illuminating unit 350R and 350L, etc.

As shown in FIG. 8, the controller 340 includes, for example, a computing unit 41, a light-adjusting unit 46, and a timing controller 349. For example, the timing controller 349 adjusts each imaging timing of the imaging units 320R and 320L. For example, to the imaging units 320R and 320L, the timing controller 349 outputs an imaging timing signal for adjusting the imaging timing.

The timing controller 349 adjusts each illumination timing for turning on and off of the illuminating units 350R and 350L. For example, to the light-adjusting unit 46, the timing controller 349 outputs an illumination timing signal related to the timing for turning on and off of the illuminating units 350R and 350L. On the basis of the illumination timing signal, the light-adjusting unit 46 creates light-quantity setting information for setting the light quantity of each light source of the illuminating units 350R and 350L. For example, when the illuminating units 350R and 350L are turned off, the light-adjusting unit 46 creates the light-quantity setting information that sets the light quantities of all the light sources to be 0. When the illuminating units 350R and 350L are turned on, the light-adjusting unit 46 creates the light-quantity setting information that sets the light quantity of each light source to be a predetermined light quantity.

Each of the imaging units 320R and 320L includes the same configuration as that of the imaging unit 20 shown in FIG. 2. Therefore, detailed description of these parts will be omitted. Each of the imaging units 320R and 320L takes the image on the basis of the imaging timing signal output from the timing controller 349. For example, a light-exposure controller 26 of each of the imaging units 320R and 320L controls each unit on the basis of the imaging timing signal.

Each of the illuminating units is arranged in vicinity of the imaging unit. For example, the imaging unit 320R is arranged in vicinity of the illuminating unit 350R. The imaging unit 320R and the illuminating unit 350R may be housed in the same housing. Alternatively, a part of parts of the imaging unit 320R and the illuminating unit 350R may be used, for example, in common, so that they are configured to be unified. For example, the imaging unit 320L is arranged in vicinity of the illuminating unit 350L. The imaging unit 320L and the illuminating unit 350L may be housed in the same housing. Alternatively, a part of parts of the imaging unit 320L and the illuminating unit 350L may be used, for example, in common, so that they are configured to be unified.

The illuminating unit 350R is arranged on, for example, a right side end of the front side of the vehicle 1. The illuminating unit 350R mainly illuminates, for example, right side ahead of the vehicle 1. The illuminating unit 350L is arranged on, for example, a left side end of the front side of the vehicle 1. The illuminating unit 350L mainly illuminates, for example, left side ahead of the vehicle 1. Note that each parts of the illuminating units 350R and 350L has the same configuration as that of each parts of the illuminating unit 50 shown in FIG. 2. Each of the illuminating units 350R and 350L is turned on and off on the basis of the illumination timing signal output from the timing controller 349. For example, each light source of the illuminating units 350R and 350L is turned on and off on the basis of the light-quantity setting information output from the light-adjusting unit 46.

Incidentally, the illuminating unit 350R and the imaging unit 320R are arranged in vicinity of each other, and the illuminating unit 350L and the imaging unit 320L are arranged in vicinity of each other. Therefore, it is necessary that the illumination light output from the illuminating units 350R and 350L does not leak and enter the imaging units 320R and 320L as ambient light.

Figure 9:
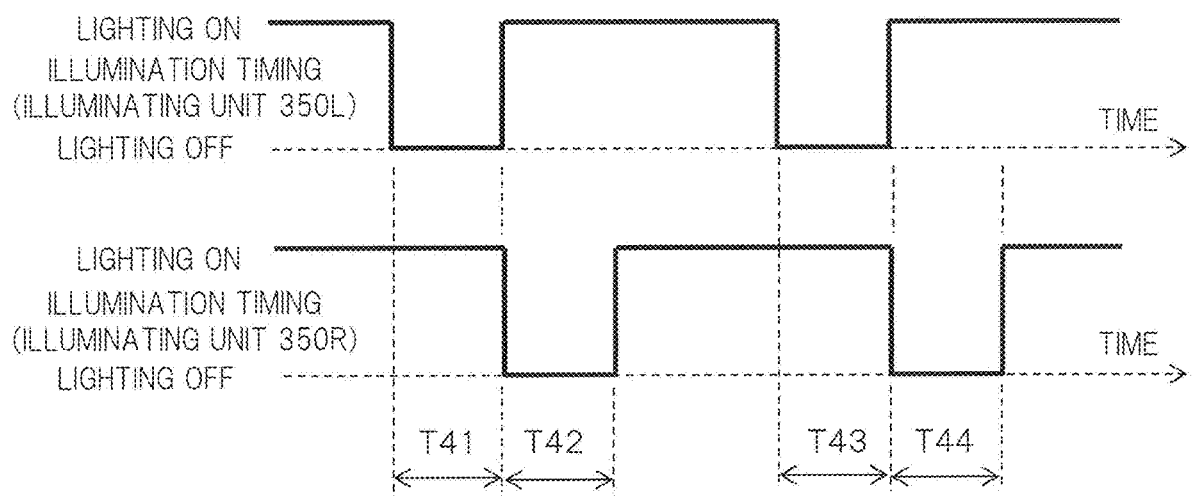
FIG. 9 is a diagram showing one example of an illumination timing of an illuminating unit according to the fourth embodiment of the present invention.
Figure 9:
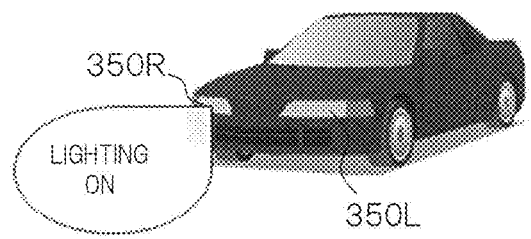
Figure 9:
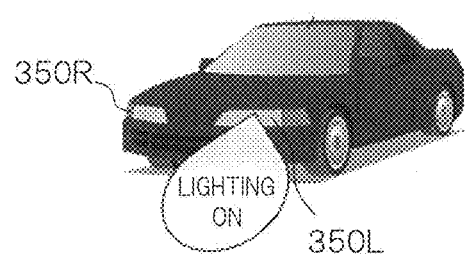

Here, examples of the imaging timing of each of the imaging units 320R and 320L and the illumination timing (for turning on and off) of each of the illuminating units 350R and 350L will be described. FIG. 9 is a diagram showing one example of the illumination timing of each of the illuminating units according to the fourth embodiment of the present invention. FIG. 9(a) is a diagram showing one example of the illumination timing of each of the illuminating units 350R and 350L. FIG. 9(b) is a diagram showing a state of each of the illuminating units 350R and 350L caused when being imaged by the imaging unit 320L. FIG. 9(c) is a diagram showing a state of each of the illuminating units 350R and 350L caused when being imaged by the imaging unit 320R.

When one of the imaging units takes the image, the controller 340 turns off the illuminating unit arranged in vicinity of the one imaging unit. For example, the illuminating unit 350L is turned off during periods T41 and T43 and turned on during other periods as shown in FIG. 9(a). The illuminating unit 350R is turned off during periods T42 and T44 and turned on during other periods as shown in FIG. 9(a). The imaging unit 320L takes the image within the periods T41 and T43 shown in FIG. 9(b). That is, the imaging unit 320L takes the image while the illuminating unit 350L is turned off but the illuminating unit 350R is turned on. On the other hand, the imaging unit 320R takes the image within the periods T42 and T44 shown in FIG. 9(c). That is, the imaging unit 320R takes the image while the illuminating unit 350R is turned off but the illuminating unit 350L is turned on.

The luminance adjustment in the illuminating unit 350R is performed on the basis of the image data created by the imaging unit 320R. The luminance adjustment in the illuminating unit 350L is performed on the basis of the image data created by the imaging unit 320L.

At the time of the imaging by the imaging units 320R and 320L, either the illuminating unit 350R or 350L is turned off, and therefore, the light quantity of the illumination light on the imaging region is decreased. Accordingly, at the time of the imaging by the imaging units 320R and 320L, the light is adjusted so that the light quantity of the turned-on illuminating unit is temporarily increased.

Figure 10:
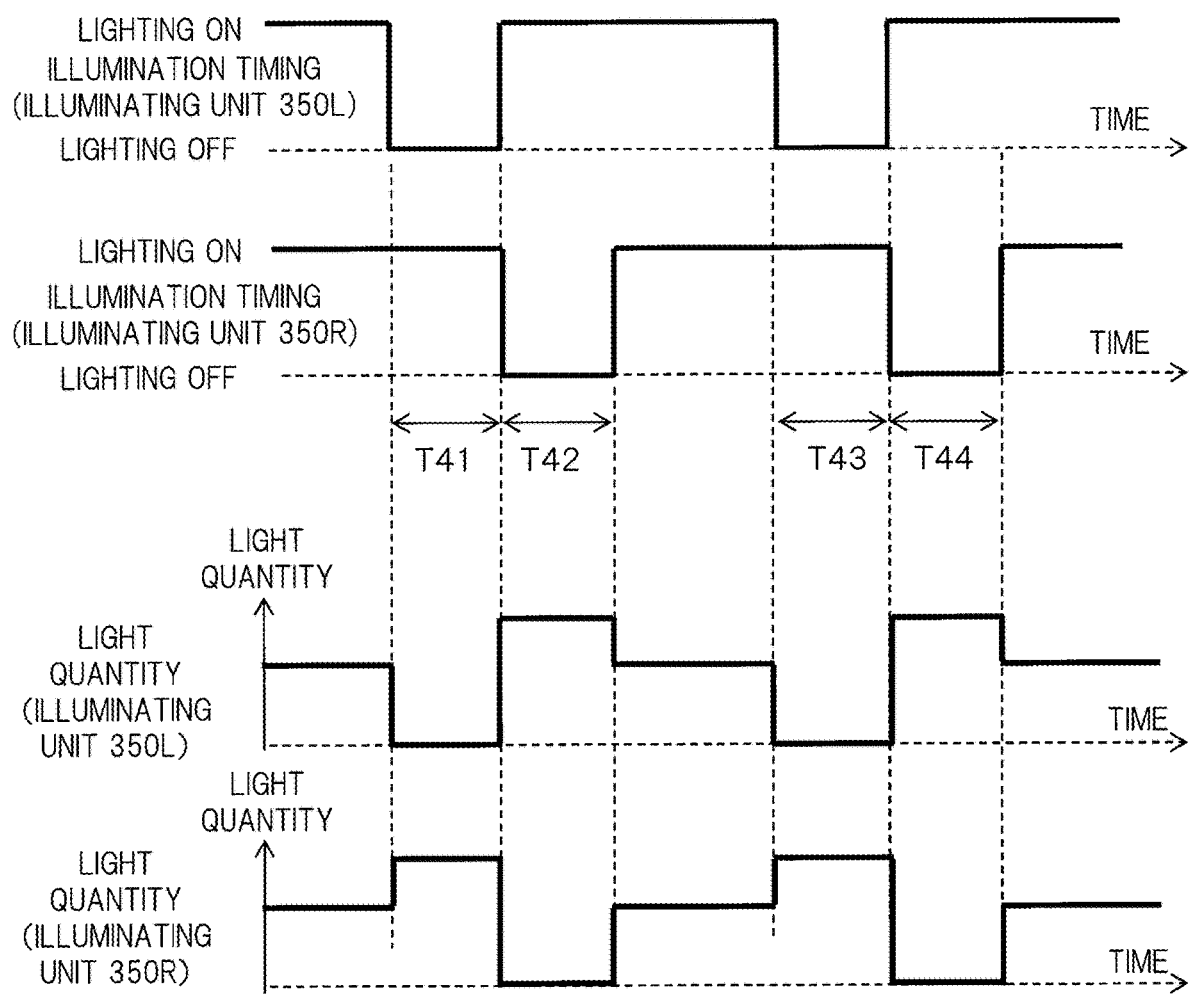
FIG. 10 is a diagram showing one example of relation between a light quantity and an illumination timing of illuminating units according to the fourth embodiment of the present invention.

FIG. 10 is a diagram showing one example of relation between the light quantity and the illumination timing of the illuminating units according to the fourth embodiment of the present invention. The illumination timing of each of the illuminating units 350R and 350L is the same as that of FIG. 9(a). As shown in FIG. 10, the light quantity of the illuminating unit 350R set when the illuminating unit 350L is turned off is larger than that set when the illuminating unit 350L is turned on. For example, the light-adjusting unit 46 outputs the light-quantity setting information that increases the light quantity of the illuminating unit 350R together with the light-quantity setting information that turns off the illuminating unit 350L.

On the other hand, as shown in FIG. 10, the light quantity of the illuminating unit 350L obtained when the illuminating unit 350R is turned off is larger than that obtained when the illuminating unit 350R is turned on. For example, the light-adjusting unit 46 outputs the light-quantity setting information that increases the light quantity of the illuminating unit 350L together with the light-quantity setting information that turns off the illuminating unit 350R.

According to the present embodiment, the following effects are obtained in addition to the effects of the above-described embodiments. For example, according to the present embodiment, the illuminating unit 350R and the imaging unit 320R are arranged in vicinity of each other. And, the illuminating unit 350L and the imaging unit 320L are arranged in vicinity of each other. According to this configuration, disparity between the imaging unit 320R and the illuminating unit 350R can be suppressed, and therefore, mismatch between an imaging region of the image and a practical imaging region can be suppressed. In this case, mismatch in the luminance adjustment between the partial regions can be suppressed.

According to the present embodiment, the illuminating unit 350R and the imaging unit 320R are housed in the same housing, and the illuminating unit 350L and the imaging unit 320L are housed in the same housing. According to this configuration, the illuminating unit 350R and the imaging unit 320R are handled to be unified, and the illuminating unit 350L and the imaging unit 320L are handled to be unified, and therefore, the handling of these units becomes easy. In the manner, shift in a relative position between the illuminating unit 350R and the imaging unit 320R and shift in a relative position between the illuminating unit 350L and the imaging unit 320L are suppressed, and therefore, reliability of the illumination apparatus 10 is improved.

According to the present embodiment, in the case of the imaging by the imaging unit 320R, the controller 340 turns off the illuminating unit 350R. And, in the case of the imaging by the imaging unit 320L, the controller 340 turns off the illuminating unit 350L. According to this configuration, at the imaging, the ambient light that leaks and enters the imaging units 320R and 320L is suppressed, and therefore, the imaging regions are clearly taken. In the manner, the average luminance of each partial region is correctly calculated, and more correct luminance adjustment is performed.

Fifth Embodiment

Next, a fifth embodiment of the present invention will be described. The section of the above-described first embodiment has described the case of the light adjustment for the partial region in consideration of the illumination light of the car 101 running ahead. In this case, for example, such a merit of the reduction of the power consumption because of the dimming is given only to the own car. On the other hand, the light may be adjusted so as to give such a merit of the reduction of the power consumption to a different car. Accordingly, a section of the present embodiment will describe a case of the illumination light adjustment in cooperation with the different car through so-called car-to-car communication. Note that description of parts overlapped with those of the above-described embodiments will be omitted in principle below.

Figure 11:
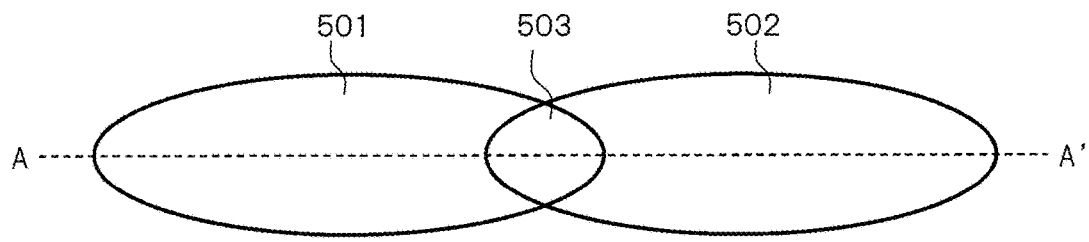
FIG. 11 is a diagram showing one example of a light-adjusting method of an illumination apparatus according to a fifth embodiment of the present invention.
Figure 11:
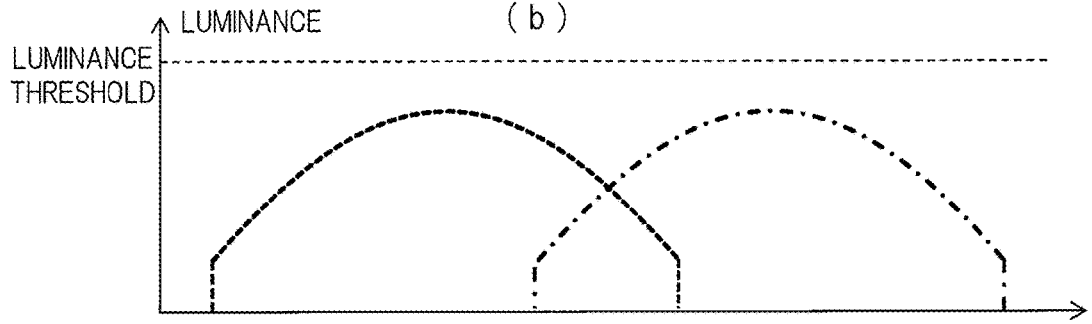
Figure 11:
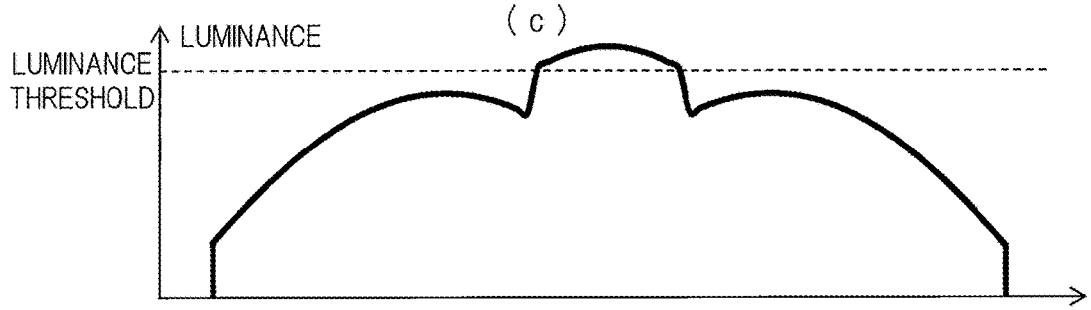
Figure 11:
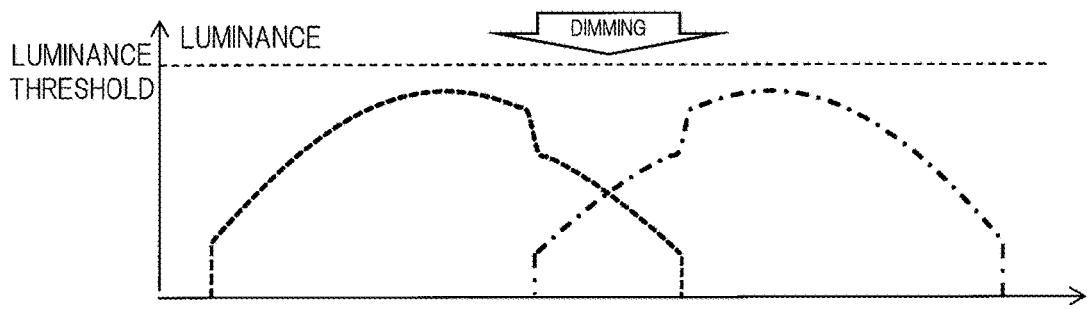
Figure 11:
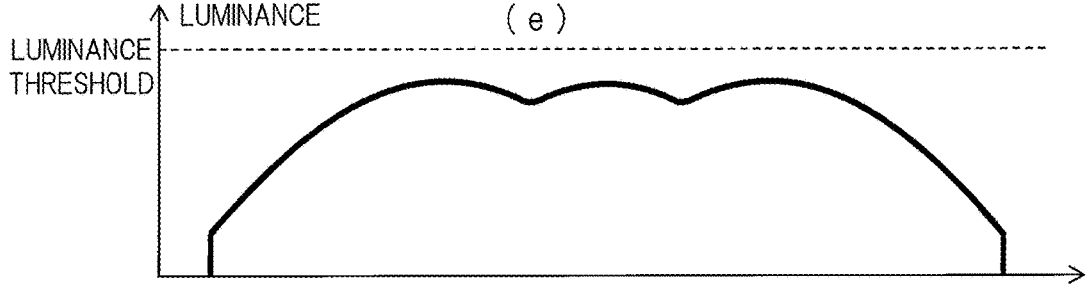

FIG. 11 is a diagram showing one example of a light-adjusting method of an illumination apparatus according to the fifth embodiment of the present invention. FIG. 11(*a*) is a diagram showing each illuminated region by the own car and the different car. FIG. 11(*b*) is a diagram showing luminance distribution of each illuminated region by the own car and the different car before the light adjustment on a line A-A' of FIG. 11(*a*). FIG. 11(*c*) is a diagram showing total of each luminance distribution of the own car and the different car before the light adjustment on the line A-A'. FIG. 11(*d*) is a diagram showing luminance distribution of each illuminated region by the own car and the different car after the light adjustment on the line A-A'. FIG. 11(*e*) is a diagram showing total of each luminance distribution of the own car and the different car after the light adjustment on the line A-A'.

In the present embodiment, each of the own car (such as the vehicle 1) and the different car (such as the car 101 running ahead) includes an information communicating unit not shown in the drawings. The own car and the different car transmit and receive various information by using the car-to-car communication through the information communicating units. Each information communicating unit may be arranged in the above-described illumination apparatuses 10 and 310, or may be separately arranged from the above-described illumination apparatuses 10 and 310.

As shown in FIG. 11(*a*), each of the own car (such as the vehicle 1) and the different car (such as the car 101 running ahead) illuminate predetermined illumination regions 501 and 502, respectively. As shown in FIG. 11(*a*), the illuminated region 501 by the own car and the illumination region 502 by the different car overlap each other in a common illuminated region 503. That is, in FIG. 11, the illuminated regions by the illuminating units of the plurality of vehicles overlap each other.

The illumination light of each of the own car and the different car has, for example, the luminance distribution as shown in FIG. 11(*b*). The total of the luminances caused by the illumination light has, for example, distribution as shown in FIG. 11(*c*). According to the FIG. 11(*c*), inside the common illuminated region 503, there is a region where the luminance of the illumination light exceeds the predetermined luminance threshold. Accordingly, the controller 40 of one vehicle (such as the own car) or others performs light adjustment for an average luminance of the common illuminated region 503 in cooperation with the controller of another vehicle (such as the different car) by using the car-to-car communication through the information communicating units.

For example, when each of the own car and the different car adjusts the light of the illumination apparatus by using the method described in the above-described embodiments, the light-quantity setting information of the light sources that illuminate the common illuminated region 503 are shared between the own car and the different car. For example, the own car and the different car transmit/receive the light-quantity setting information of the light sources that illuminate each partial region including the common illuminated region 503 to/from each other through the information communicating units. As shown in FIG. 11(*d*), the own car and the different car reduce the light quantities of the light sources that illuminate the common illuminated region 503. In the manner, the luminance of the common illuminated region 503 after the light adjustment is equal to or lower than the luminance threshold as shown in FIG. 11(*e*).

Note that the luminance threshold of the present embodiment is also set to a value that meets the requirements described in, for example, the ECE regulations, the sections 6.2.4, 6.3.3, and others as described above.

According to the present embodiment, the following effects are obtained in addition to the effects of the above-described embodiments. For example, according to the present embodiment, when the illuminated region 501 by the own car and the illuminated region 502 by the different car overlap each other in the common illuminated region 503, for example, the controller 40 of the own car or others performs the light adjustment for the average luminance of the common illuminated region 503 in cooperation with the controller of the different car by using the car-to-car communication through the information communicating units. According to this configuration, for example, the light quantity of the light source of the illuminating unit is adjusted in not only the own car but also the different car, and therefore, the power consumptions in the plurality of vehicles are reduced.

Sixth Embodiment

Next, a sixth embodiment of the present invention will be described. As information to be recognized by a driver under the safe car driving, there are obstacles such as pedestrians, animals, traffic signs, traffic signals, traffic lanes, and moving bodies. The driver desirably drives the vehicle while recognizing these pieces of the information without missing the information. However, during the night during which the surrounding is dark or others, it is difficult to recognize all the obstacles in some cases. Meanwhile, by the trigger such as the research and development aiming at the automated driving, sensing techniques for recognizing the states outside and inside the car in real time by using cameras and radars instead of human eyes have been developed.

Accordingly, in consideration of the contents of the above-described embodiments, a section of the present embodiment will describe a light-adjusting method used when the driver is not recognizing the obstacles. Note that the description of parts overlapped with those of the above-described embodiments will be omitted in principle below.

Figure 12:
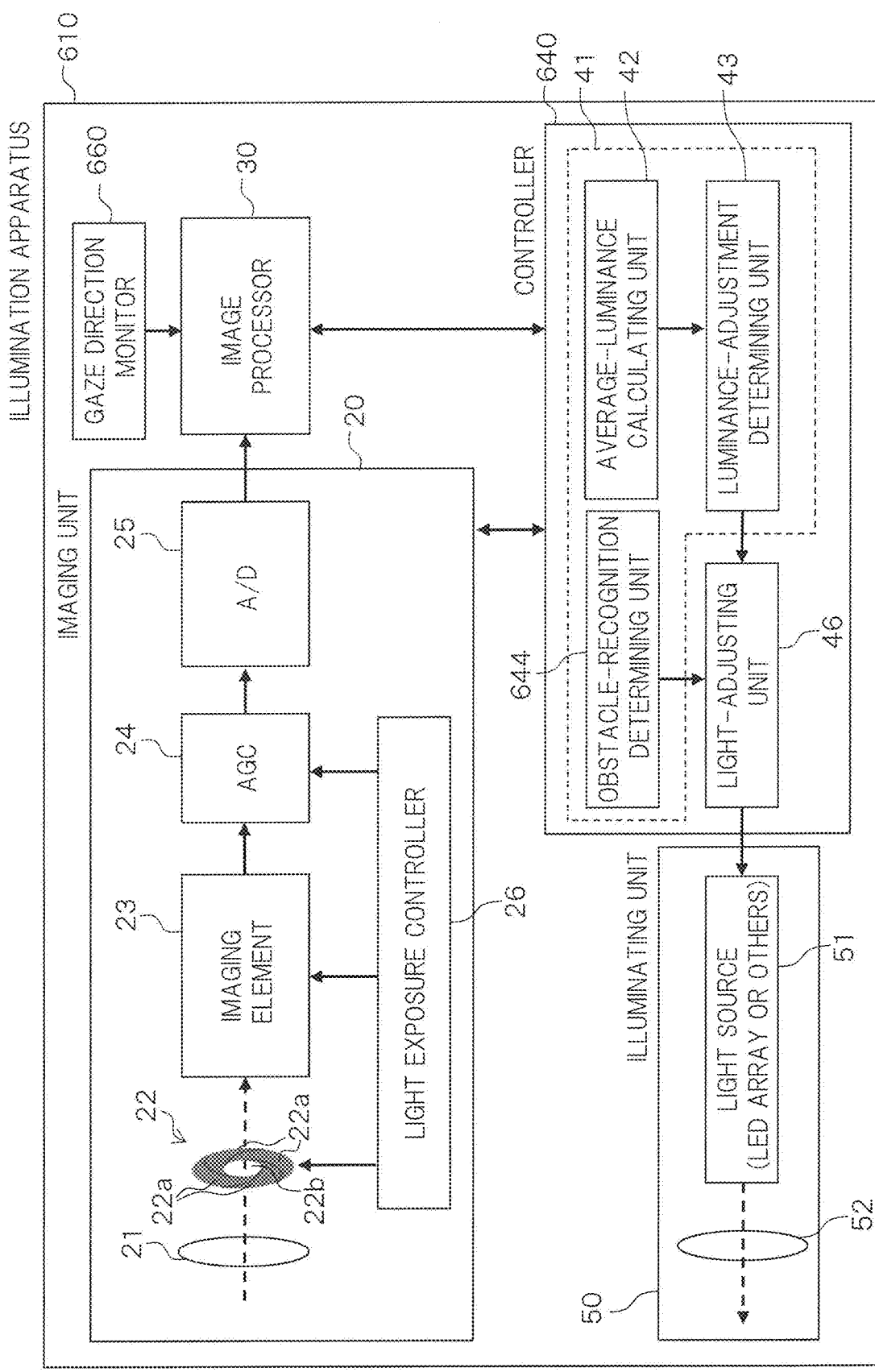
FIG. 12 is a diagram showing one example of a configuration of an illumination apparatus according to a sixth embodiment of the present invention.

FIG. 12 is a diagram showing one example of a configuration of an illumination apparatus according to the sixth embodiment of the present invention. As shown in FIG. 12, an illumination apparatus 610 includes, for example, an imaging unit 20, an image processor 30, a controller 640, an illuminating unit 50, and a gaze direction monitor 660, etc.

The gaze direction monitor 660 is made of, for example, an imaging apparatus or others that creates still images and motion images of the driver. The gaze direction monitor 660 acquires gaze direction information of the driver. For example, the gaze direction monitor 660 detects a gaze direction of the driver from the images of the driver created by the imaging apparatus, and creates the gaze direction information related to the gaze direction. The gaze direction monitor 660 outputs the created gaze direction information to the image processor 30. Note that the gaze direction monitor 660 may output the created gaze direction information to the controller 640.

On the basis of the image data, the image processor 30 detects, for example, the traffic signs, the traffic signals, the pedestrians, the animals, other obstacles and positions of them. The image processor 30 creates, for example, obstacle position information related to the positions of the obstacles. To the controller 640, the image processor 30 outputs the obstacle position information and the gaze direction information output from the gaze direction monitor 660 together with the luminance information.

As shown in FIG. 12, the controller 640 includes, for example, a computing unit 641 and a light-adjusting unit 46. As shown in FIG. 12, the computing unit 641 includes, for example, an average-luminance calculating unit 42, a luminance-adjustment determining unit 43, and an obstacle-recognition determining unit 644.

On the basis of, for example, the obstacle position information and the gaze direction information output from the image processor 30, the obstacle-recognition determining unit 644 determines whether the driver is recognizing the obstacle. For example, the obstacle-recognition determining unit 644 detects the position of the obstacle from the obstacle position information. And, the obstacle-recognition determining unit 644 detects the gaze direction of the driver from the gaze direction information. Then, the obstacle-recognition determining unit 644 compares the obstacle position information with the gaze direction of the driver to determine whether the gaze direction of the driver has been oriented to the direction of the obstacle.

Alternatively, for example, the obstacle-recognition determining unit 644 may continuously perform such determination to determine time during which the gaze direction of the driver has been oriented to the direction of the obstacle on the basis of the gaze direction information. In this case, if the time during which the gaze direction of the driver has been oriented to the direction of the obstacle exceeds predetermined obstacle recognition time, the obstacle-recognition determining unit 644 determines that the driver has recognized the obstacle. If the time during which the gaze direction of the driver has been oriented to the direction of the obstacle is equal to or shorter than the predetermined obstacle recognition time, the obstacle-recognition determining unit 644 determines that the driver has not recognized the obstacle.

Then, the obstacle-recognition determining unit 644 creates obstacle-recognition determining information related to the result of the determination of whether the driver has recognized the obstacle. The obstacle-recognition determining unit 644 outputs the created obstacle-recognition determining information to the light-adjusting unit 46.

The light-adjusting unit 46 creates the light-quantity setting information for each light source on the basis of the luminance-adjustment determining information output from the luminance-adjustment determining unit 43 and the obstacle-recognition determining information. For example, the light-adjusting unit 46 creates the light-quantity setting information that decreases the light quantity of the light source illuminating the partial region whose average luminance exceeds the luminance threshold but increases the light quantity of the light source illuminating the partial region including the obstacle determined as an obstacle not having been recognized by the driver.

On the basis of the light-quantity setting information output from the light-adjusting unit 46, the illuminating unit 50 decreases the luminance of the partial region whose average luminance exceeds the luminance threshold but increases the luminance of the partial region including the obstacle determined as the obstacle not having been recognized by the driver.

Figure 13:
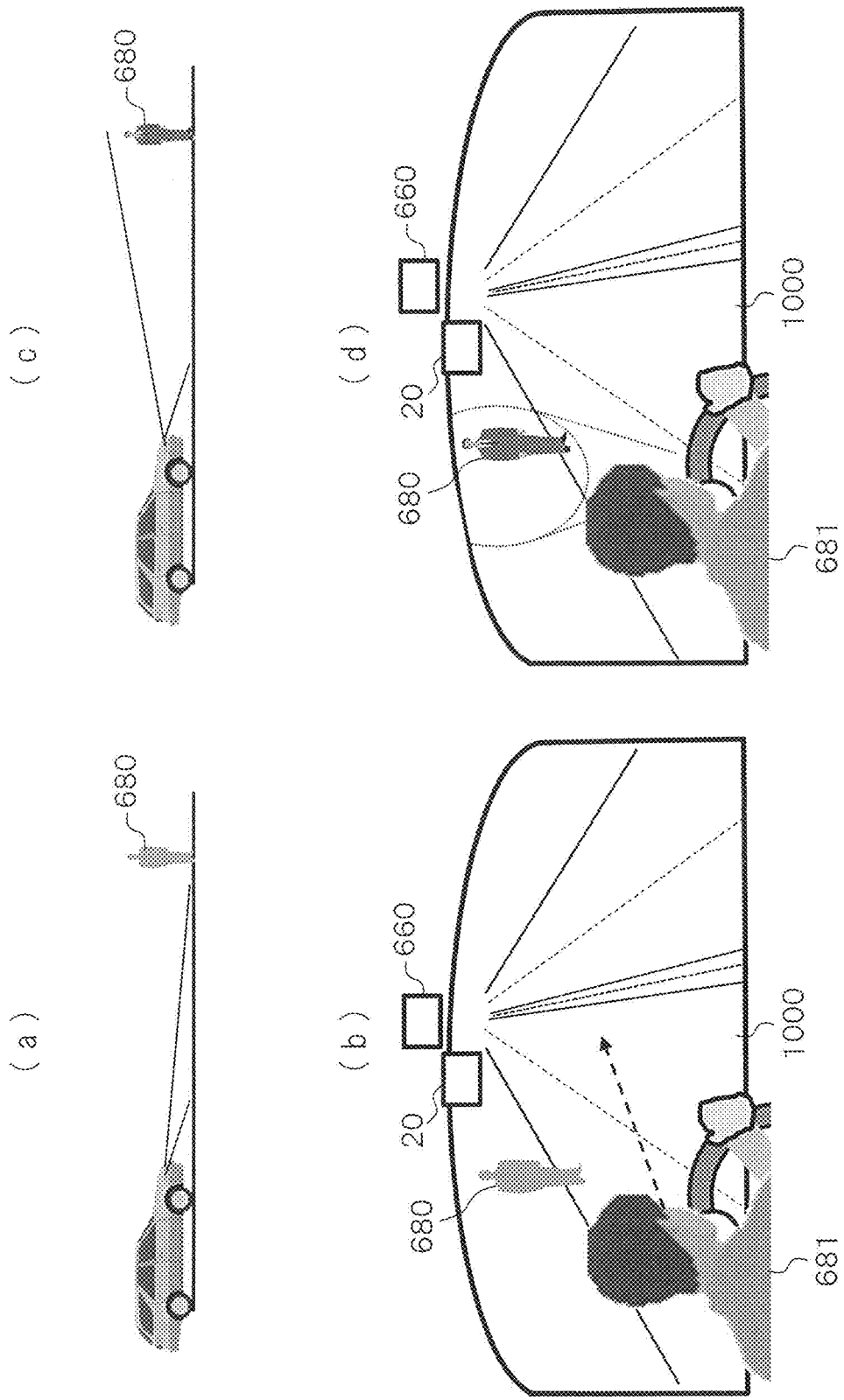
FIG. 13 is a diagram showing one example of monitoring a gaze direction of a driver according to the sixth embodiment of the present invention.

Here, one example of the light-adjusting method on the basis of the obstacle-recognition determining information will be described. FIG. 13 is a diagram showing one example of monitoring the gaze direction of the driver according to the sixth embodiment of the present invention. FIG. 13(*a*) is a diagram showing the illumination direction before the light adjustment. FIG. 13(*b*) is a diagram showing scenery in front of the vehicle obtained before the light adjustment. FIG. 13(*c*) is a diagram showing the illumination direction after the light adjustment. FIG. 13(*d*) is a diagram showing the scenery in front of the vehicle obtained after the light adjustment.

As shown in FIG. 13(*a*), the illuminating unit 50 before the light adjustment mainly illuminates a region in front of a pedestrian 680 but hardly illustrates the pedestrian 680. At this time, as shown in FIG. 13(*b*), a gaze direction of a driver 681 is being oriented to a direction of a road surface 1000, but is not being oriented to a direction of the pedestrian 680. At this time, to the controller 640, the gaze direction monitor 660 outputs the gaze direction information of the driver 681 being oriented to the road surface direction. The controller 640 determines that the driver 681 has not recognized the pedestrian 680, and adjusts the light so as to illuminate the pedestrian 680.

As shown in FIG. 13(*c*), the illuminating unit 50 illuminates the pedestrian 680 on the basis of the light-quantity setting information. In the manner, as shown in FIG. 13(*d*), the gaze direction of the driver 681 is oriented to the pedestrian 680. In the manner, the driver 681 can recognize the pedestrian 680.

In the present embodiment, note that the partial region including the obstacle may be set in accordance with, for example, a shape of the obstacle. In the manner, only the light source illuminating the obstacle is appropriately selected, and therefore, the illumination to the obstacle is efficiently performed.

Note that the controller 640 may include, for example, a timing adjusting unit 349 shown in FIG. 8. The illumination apparatus 610 may include, for example, an information communicating unit not shown in the drawings.

According to the present embodiment, the following effects are obtained in addition to the effects of the above-described embodiments. For example, according to the present embodiment, the controller 640 detects the position of the obstacle (such as the pedestrian 680) on the basis of the image data, and determines whether the driver 681 has recognized the obstacle on the basis of the obstacle position and the gaze direction information of the driver 681. If the controller 640 determines that the driver 681 has not recognized the obstacle, the luminance adjustment is performed so as to increase the light quantity of the light source illuminating the obstacle. According to this configuration, the obstacle not having been recognized by the driver 681 is illuminated, and therefore, the driver 681 can recognize the obstacle. In the manner, car accidents during the driving are suppressed.

According to the present embodiment, if the time during which the gaze direction of the driver 681 is being oriented to the obstacle is equal to or shorter than the predetermined obstacle recognition time, the controller 640 determines that the driver 681 has not recognized the obstacle. According to this configuration, it is more reliably determined whether the driver 681 has recognized the obstacle, and therefore, the illumination to the obstacle is efficiently performed. In the manner, the driver 681 can more reliably recognize the obstacle while the increase in the power consumption is suppressed.

Seventh Embodiment

Figure 14:
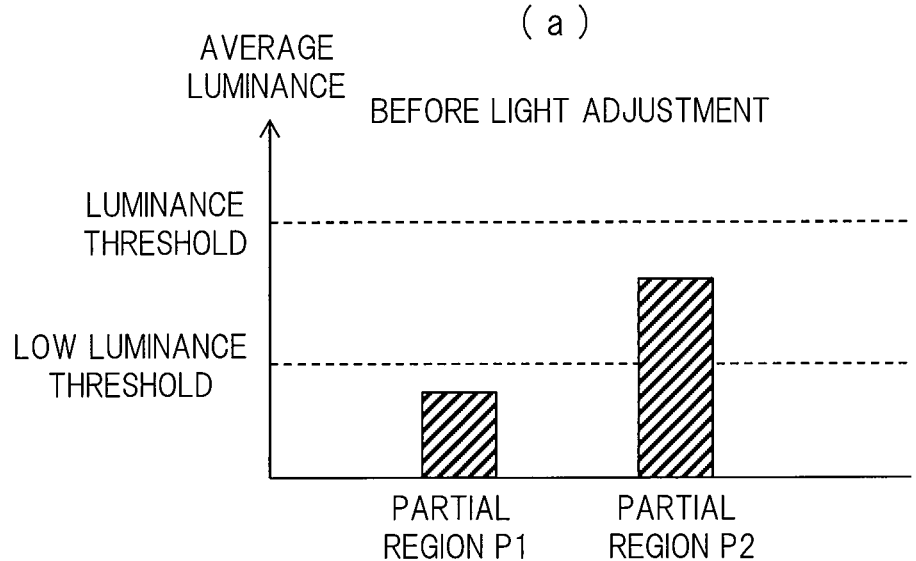
FIG. 14 is a diagram showing one example of a light-adjusting method of an illumination apparatus according to a seventh embodiment of the present invention.
Figure 14:
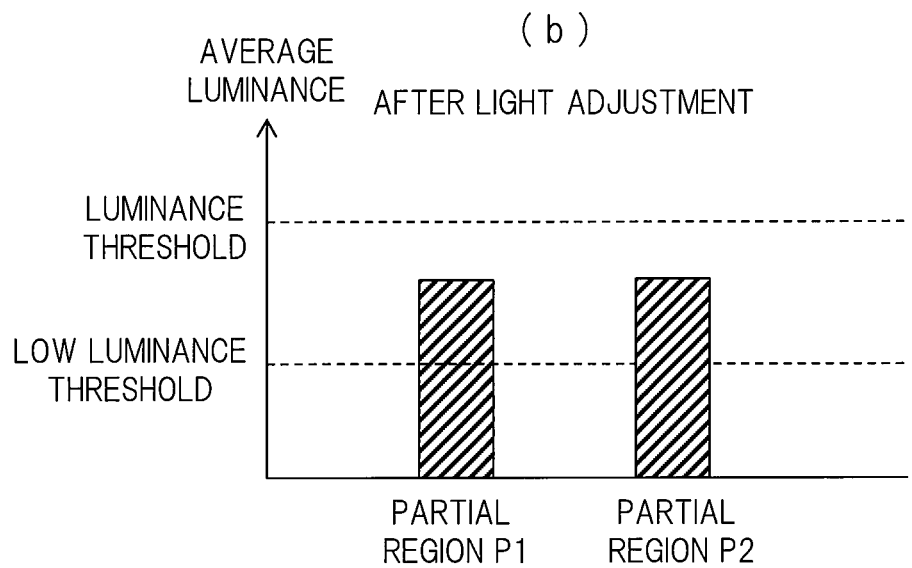

Next, a seventh embodiment of the present invention will be described. The sections of the above-described embodiments have described the light-adjusting method of decreasing the average luminance of the partial region exceeding the luminance threshold. A section of the present embodiment will describe a light-adjusting method of increasing the average luminance of each partial region within a range in which the average luminance does not exceed the luminance threshold. Note that the description of parts overlapped with those of the above-described embodiments will be omitted in principle below. FIG. 14 is a diagram showing one example of a light-adjusting method of an illumination apparatus according to the seventh embodiment of the present invention. FIG. 14(*a*) is a diagram showing the average luminance of each of partial regions P1 and P2 before the light adjustment. FIG. 14(*b*) is a diagram showing the average luminance of each of the partial regions P1 and P2 after the light adjustment.

For example, on the basis of the average-luminance information, the controller 40 of FIG. 2 determines whether it is necessary to perform the luminance adjustment for each partial region. First, the luminance-adjustment determining unit 43 determines whether the average luminance of each partial region is lower than a predetermined low luminance threshold. The low luminance threshold described in the specification defines a lower limit of the average luminance of each partial region. The information related to the low luminance threshold is stored in, for example, a data storage not illustrated in the drawings, and the luminance-adjustment determining unit 43 reads out the information related to the low luminance threshold from the data storage. Note that the low luminance threshold may be common among all the partial regions.

Then, on the basis of the average-luminance information and the low luminance threshold, the luminance-adjustment determining unit 43 determines whether it is necessary to perform the luminance adjustment for each partial region. For example, the luminance-adjustment determining unit 43 determines that it is necessary to perform the luminance adjustment for a partial region whose average luminance is lower than the low luminance threshold. The luminance-adjustment determining unit 43 determines that it is unnecessary to perform the luminance adjustment for a partial region whose average luminance is equal to or higher than the low luminance threshold.

In the example of FIG. 14, as shown in FIG. 14(*a*), the average luminance of the partial region P1 is lower than the low luminance threshold, and therefore, the luminance-adjustment determining unit 43 determines that it is necessary to perform the luminance adjustment for the partial region P1. For example, the light-adjusting unit 46 adjusts the light quantity of the light source illuminating the partial region P1. For example, the light-adjusting unit 46 creates the light-quantity setting information that increases the light quantity of each light source illuminating the partial region P1 so that the luminance of the partial region is equal to or higher than the low luminance threshold as well as being equal to or lower than the luminance threshold. The light source unit 51 of the illuminating unit 50 increases the light quantity of each light source on the basis of the light-quantity setting information. In the manner, as shown in FIG. 14(*b*), the average luminance of the partial region P2 is equal to or higher than the low luminance threshold as well as being equal to or lower than the luminance threshold.

On the other hand, as shown in FIG. 14(*a*), the average luminance of the partial region P2 is equal to or higher than the low luminance threshold, and therefore, the luminance-adjustment determining unit 43 determines that it is unnecessary to perform the luminance adjustment for the partial region P2. In this case, the average luminance of the partial region P2 is maintained as, for example, shown in FIG. 14(*b*).

For example, if the average luminance of the partial region that is the determination target exceeds the predetermined luminance threshold, the light-adjusting unit 46 adjusts the light so that the average luminance of this partial region is equal to or higher than the low luminance threshold as well as being equal to or lower than the luminance threshold.

According to the present embodiment, the following effects are obtained in addition to the effects of the above-described embodiments. For example, according to the present embodiment, on the basis of the luminance threshold and the low luminance threshold, the controller 40 or others determines whether it is necessary to perform the luminance adjustment for each partial region. If the average luminance of the partial region that is the determination target is lower than the low luminance threshold, the controller 40 or others determines that it is necessary to perform the luminance adjustment for the partial region that is the determination target. Then, the controller 40 or others performs the luminance adjustment so that the average luminance of the partial region that is the determination target is equal to or higher than the low luminance threshold as well as being equal to or lower than the luminance threshold. According to this configuration, when the average luminance is too low, the luminance adjustment is performed so as to increase the average luminance of the partial region that is the determination target to be between the low luminance threshold and the luminance threshold, and therefore, variation in the luminance among the plurality of partial regions is suppressed. In the manner, occasions in which the driver feels uncomfortable with the variation in the luminance of the imaging region are suppressed, and stress on the driver during the driving is moderated.

According to the present embodiment, on the basis of the luminance threshold and the low luminance threshold, the controller 40 or others determines whether it is necessary to perform the luminance adjustment for each partial region. Then, if the average luminance of the partial region that is the determination target exceeds the luminance threshold, the controller 40 or others determines that it is necessary to perform the luminance adjustment for the partial region that is the determination target. Then, the controller 40 or others performs the luminance adjustment so that the average luminance of the partial region that is the determination target is equal to or higher than the low luminance threshold as well as being equal to or lower than the luminance threshold. According to this configuration, when the average luminance is too high, the luminance adjustment is performed so as to decrease the average luminance of the partial region that is the determination target to be between the low luminance threshold and the luminance threshold, and therefore, variation in the luminance among the plurality of partial regions is suppressed. In the manner, occasions in which the driver feels uncomfortable with the variation in the luminance of the imaging region are suppressed, and stress on the driver during the driving is moderated.

In the foregoing, the invention made by the present inventor has been concretely described on the basis of the embodiments. However, it is needless to say that the present invention is not limited to the foregoing embodiments, and various modifications and alterations can be made within the scope of the present invention.

Note that the present invention is not limited to the foregoing embodiments, and includes various modifications. For example, the above-described embodiments have been explained in detail for easily understanding the present invention, and are not always limited to the one including all structures explained above.

Also, apart of the structure of one embodiment can be replaced with the structure of another embodiment, and besides, the structure of another embodiment can be added to the structure of one embodiment. Further, another structure can be added to/eliminated from/replaced with a part of the structure of each embodiment. Note that each member and relative size illustrated in the drawings are simplified and idealized for easily describing the present invention, and may have more complicated shapes in practice in some cases.

Preferable main aspects of the present invention will be stated below.

[Statement 1]

In a light-adjusting method of an illumination apparatus arranged on a vehicle, the illumination apparatus including: an imaging unit configured to create an image made of a plurality of pixels by imaging a predetermined imaging region in front of the vehicle and create image data of each of the pixels on the basis of the image; an image processor configured to calculate a luminance of each of the pixels on the basis of the image data; a controller configured to calculate an average luminance of each of partial regions of the imaging region made of a plurality of the partial regions on the basis of the luminance of each of the pixels, to determine whether it is necessary to perform luminance adjustment for each of the partial regions on the basis of the average luminance and a luminance threshold defining an upper limit of the average luminance of the partial region, and to perform the luminance adjustment for the partial region on the basis of a result of the determination of the luminance adjustment; and an illuminating unit having a plurality of light sources and configured to adjust each of the light sources so as to have a predetermined light quantity on the basis of the result of the luminance adjustment generated by the luminance adjustment and to illuminate the partial region, the light-adjusting method includes: a first step of allowing the image processor to calculate the luminance of the pixel; a second step of allowing the controller to calculate the average luminance of the partial region; a third step of allowing the controller to determine whether the average luminance of the partial region that is a determination target exceeds the luminance threshold; a fourth step of allowing the controller to perform the luminance adjustment for the partial region that is the determination target when it is determined that the average luminance of the partial region that is the determination target exceeds the luminance threshold; and a fifth step of allowing the illuminating unit to adjust the light quantity of the light source illuminating the partial region that is the determination target.

[Statement 2]

In the light-adjusting method of the illumination apparatus described in the Statement 1, in the third step, the controller detects luminance-threshold exceeding time that is time during which the average luminance exceeds the luminance threshold on the basis of imaging time information related to time at which the image is taken by the imaging unit, and determines whether it is necessary to perform the luminance adjustment for each of the partial regions on the basis of the luminance-threshold exceeding time and predetermined standby time, and the controller performs the fourth step when the luminance-threshold exceeding time of the partial region that is the determination target exceeds the standby time.

[Statement 3]

In the light-adjusting method of the illumination apparatus described in the Statement 2, the controller performs a sixth step, between the second step and the third step, of calculating an average luminance of an anticipation partial region forming the partial region that is the determination target at a later stage, and the controller performs a seventh step, between the third step and the fourth step, of determining whether it is necessary to perform the luminance adjustment for the partial region that is the determination target on the basis of the luminance-threshold exceeding time, the standby time and the average luminance of the anticipation partial region caused when the luminance-threshold exceeding time exceeds the standby time. In the seventh step, the controller performs the fourth step when the luminance-threshold exceeding time of the partial region that is the determination target exceeds the standby time as well as when it is determined that the average luminance of the anticipation partial region obtained when the luminance-threshold exceeding time of the partial region that is the determination target exceeds the standby time exceeds the luminance threshold.

EXPLANATION OF REFERENCE CHARACTERS

1 . . . vehicle, 10 . . . illumination apparatus, 20 . . . imaging unit, 20A . . . imaging region, 30 . . . image processor, 40 . . . controller, 50 . . . illuminating unit, 120A . . . imaging region, 250 . . . partial region, 251 . . . anticipation partial region, 310 . . . illumination apparatus, 320R, 320L . . . imaging unit, 340 . . . controller, 350R, 350L . . . illuminating unit, 501, 502 . . . illumination region, 503 . . . common illumination region, 610 . . . illumination apparatus, 640 . . . controller, 660 . . . gaze direction monitor, 680 . . . pedestrian, 681 . . . driver, T1 to T6 . . . luminance-threshold exceeding time, Ts . . . standby time

The invention claimed is:

1. An illumination apparatus arranged on a vehicle, comprising:
an imager configured to create an image made of a plurality of pixels by imaging a predetermined region in front of the vehicle;
an image processor configured to calculate a luminance of each of the pixels on the basis of the image data;
a controller configured to calculate an average luminance of each of partial regions of the image made of a plurality of the partial regions on the basis of the luminance of each of the pixels, to determine whether it is necessary to perform luminance adjustment for each of the partial regions on the basis of the average luminance and a luminance threshold defining an upper limit of the average luminance of the partial region, and to perform the luminance adjustment for the partial region on the basis of a result of the determination of the luminance adjustment;

an illuminator having a plurality of light sources and configured to illuminate the partial region while allowing each of the light sources to adjust the light source so as to have a predetermined light quantity on the basis of the result of the luminance adjustment generated by the luminance adjustment;

wherein, when the average luminance of the partial region that is a determination target exceeds the luminance threshold, the controller determines that it is necessary to perform the luminance adjustment for the partial region that is the determination target, and performs the luminance adjustment so that the average luminance of the partial region that is the determination target is equal to or lower than the luminance threshold; and a ranging sensor configured to measure a distance from the vehicle to the partial region, wherein the luminance threshold of each of the partial regions is set on the basis of the distance measured by the ranging sensor.

2. The illumination apparatus according to claim 1, wherein the controller creates light-quantity setting information for adjusting a light quantity of each of the light sources illuminating the partial region that is the determination target, and the illuminator adjusts the light quantity of each of the light sources on the basis of the light-quantity setting information.

3. The illumination apparatus according to claim 1, wherein the controller detects luminance-threshold exceeding time that is time during which the average luminance exceeds the luminance threshold, determines whether it is necessary to perform the luminance adjustment for each of the partial regions on the basis of the luminance-threshold exceeding time and predetermined standby time, and determines that it is necessary to perform the luminance adjustment for the partial region that is the determination target when the luminance-threshold exceeding time of the partial region that is the determination target exceeds the standby time.

4. The illumination apparatus according to claim 3, wherein the controller calculates an average luminance of an anticipation partial region forming the partial region that is the determination target at a later stage, determines whether it is necessary to perform the luminance adjustment for the partial region that is the determination target on the basis of the luminance-threshold exceeding time, the standby time and the average luminance of the anticipation partial region caused when the luminance-threshold exceeding time exceeds the standby time, and determines that it is necessary to perform the luminance adjustment for the partial region that is the determination target when the luminance-threshold exceeding time of the partial region that is the determination target exceeds the standby time as well as when the average luminance of the anticipation partial region obtained when the luminance-threshold exceeding time of the partial region that is the determination target exceeds the standby time exceeds the luminance threshold.

5. The illumination apparatus according to claim 1, wherein the luminance threshold of each of the partial regions is set to a value in inverse proportion to square of the distance.

6. The illumination apparatus according to claim 1, wherein the controller determines whether it is necessary to perform luminance adjustment for each of the partial regions on the basis of the luminance threshold and a low luminance threshold defining a lower limit of the average luminance of the partial region, determines that it is necessary to perform the luminance adjustment for the partial region that is the determination target when the average luminance of the partial region that is the determination target exceeds the luminance threshold, and performs the luminance adjustment so that the average luminance of the partial region that is the determination target is equal to or higher than the low luminance threshold as well as being equal to or lower than the luminance threshold.

7. An illumination apparatus arranged on a vehicle, comprising:

an imager configured to create an image made of a plurality of pixels by imaging a predetermined region in front of the vehicle;

an image processor configured to calculate a luminance of each of the pixels on the basis of the image data;

a controller configured to calculate an average luminance of each of partial regions of the image made of a plurality of the partial regions on the basis of the luminance of each of the pixels, to determine whether it is necessary to perform luminance adjustment for each of the partial regions on the basis of the average luminance and a luminance threshold defining an upper limit of the average luminance of the partial region, and to perform the luminance adjustment for the partial region on the basis of a result of the determination of the luminance adjustment; and an illuminator having a plurality of light sources and configured to illuminate the partial region while allowing each of the light sources to adjust the light source so as to have a predetermined light quantity on the basis of the result of the luminance adjustment generated by the luminance adjustment, wherein, when the average luminance of the partial region that is a determination target exceeds the luminance threshold, the controller determines that it is necessary to perform the luminance adjustment for the partial region that is the determination target, and performs the luminance adjustment so that the average luminance of the partial region that is the determination target is equal to or lower than the luminance threshold, wherein the illuminator and the imager are arranged to be close to each other; and a plurality of the illuminators and a plurality of the imagers, the imager being arranged to be close to each of the illuminators, wherein, when one of the imagers takes the image, the controller turns off the illuminator arranged to be close to the one imager.

8. The illumination apparatus according to claim 7, wherein the illuminator and the imager are housed in the same housing.

9. An illumination apparatus arranged on a vehicle, comprising:

an imager configured to create an image made of a plurality of pixels by imaging a predetermined region in front of the vehicle;

an image processor configured to calculate a luminance of each of the pixels on the basis of the image data;

a controller configured to calculate an average luminance of each of partial regions of the image made of a plurality of the partial regions on the basis of the luminance of each of the pixels, to determine whether it is necessary to perform luminance adjustment for each of the partial regions on the basis of the average luminance and a luminance threshold defining an upper limit of the average luminance of the partial region, and to perform the luminance adjustment for the partial region on the basis of a result of the determination of the luminance adjustment; and an illuminator having a plurality of light sources and configured to illuminate the partial region while allowing each of the light sources to adjust the light source so as to have a predetermined light quantity on the basis of the result of the luminance adjustment generated by the luminance adjustment;

wherein, when the average luminance of the partial region that is a determination target exceeds the luminance threshold, the controller determines that it is necessary to perform the luminance adjustment for the partial region that is the determination target, and performs the luminance adjustment so that the average luminance of the partial region that is the determination target is equal to or lower than the luminance threshold;

wherein the vehicle includes an information communicator performing car-to-car communication, and when illumination regions illuminated by the illuminators of a plurality of the vehicles overlap each other, the controller of one of the vehicles performs the luminance adjustment for the average luminance of the overlapping illumination region in cooperation with the controller of another of the vehicles by using the car-to-car communication through the information communicators.

10. An illumination apparatus arranged on a vehicle, comprising:

an imager configured to create an image made of a plurality of pixels by imaging a predetermined region in front of the vehicle;

an image processor configured to calculate a luminance of each of the pixels on the basis of the image data;

a controller configured to calculate an average luminance of each of partial regions of the image made of a plurality of the partial regions on the basis of the luminance of each of the pixels, to determine whether it is necessary to perform luminance adjustment for each of the partial regions on the basis of the average luminance and a luminance threshold defining an upper limit of the average luminance of the partial region, and to perform the luminance adjustment for the partial region on the basis of a result of the determination of the luminance adjustment; and an illuminator having a plurality of light sources and configured to illuminate the partial region while allowing each of the light sources to adjust the light source so as to have a predetermined light quantity on the basis of the result of the luminance adjustment generated by the luminance adjustment;

wherein, when the average luminance of the partial region that is a determination target exceeds the luminance threshold, the controller determines that it is necessary to perform the luminance adjustment for the partial region that is the determination target, and performs the luminance adjustment so that the average luminance of the partial region that is the determination target is equal to or lower than the luminance threshold;

a gaze direction monitor configured to acquire gaze direction information related to gaze direction of a driver of the vehicle, wherein the controller detects a position of an obstacle on the basis of the image data, determines whether the driver has recognized the obstacle on the basis of the position of the obstacle and the gaze direction information, and performs the luminance adjustment so as to increase the light quantity of the light source illuminating the obstacle when it is determined that the driver has not recognized the obstacle; and wherein the controller detects time during which the gaze direction of the driver is oriented to the obstacle on the basis of the gaze direction information, and determines that the driver has not recognized the obstacle when the time during which the gaze direction of the driver is oriented to the obstacle is equal to or shorter than obstacle recognition time.

* * * * *